United States Patent
Potapov et al.

(10) Patent No.: US 7,454,403 B2
(45) Date of Patent: Nov. 18, 2008

(54) METHOD AND MECHANISM OF IMPROVING PERFORMANCE OF DATABASE QUERY LANGUAGE STATEMENTS USING DATA DUPLICATION INFORMATION

(75) Inventors: Dmitry M. Potapov, Redwood City, CA (US); Cetin Ozbutun, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 10/426,452

(22) Filed: Apr. 29, 2003

(65) Prior Publication Data

US 2003/0212694 A1 Nov. 13, 2003

Related U.S. Application Data

(63) Continuation-in-part of application No. 10/144,689, filed on May 10, 2002, now Pat. No. 7,103,608.

(51) Int. Cl.
*G06F 7/00* (2006.01)
*G06F 17/00* (2006.01)
*G06F 17/30* (2006.01)

(52) U.S. Cl. ............... 707/2; 707/5; 707/100; 707/102

(58) Field of Classification Search ............ 707/2, 707/5, 100, 102
See application file for complete search history.

(56) References Cited

U.S. PATENT DOCUMENTS

| | | | |
|---|---|---|---|
| 4,862,167 A | 8/1989 | Copeland, III | |
| 5,237,460 A | 8/1993 | Miller et al. | |
| 5,357,431 A * | 10/1994 | Nakada et al. | 715/531 |
| 5,414,834 A | 5/1995 | Alexander et al. | |
| 5,426,426 A * | 6/1995 | Hymel | 340/7.41 |
| 5,627,995 A | 5/1997 | Miller et al. | |
| 5,787,415 A | 7/1998 | Jacobson et al. | |
| 5,918,225 A * | 6/1999 | White et al. | 707/3 |
| 5,936,560 A | 8/1999 | Higuchi | |
| 6,006,232 A | 12/1999 | Lyons | |
| 6,112,209 A * | 8/2000 | Gusack | 707/101 |
| 6,199,070 B1 * | 3/2001 | Polo-Wood et al. | 707/202 |
| 6,205,453 B1 | 3/2001 | Tucker et al. | |
| 6,208,273 B1 | 3/2001 | Dye et al. | |
| 6,360,300 B1 | 3/2002 | Corcoran et al. | |

(Continued)

OTHER PUBLICATIONS

Chen, WT et al. "Counter for Full Table Scan Control in Data Redistribution." IBM Technical Disclosure Bulletin, Sep. 1992, vol. 35, No. 4B, pp. 3-4.*

(Continued)

*Primary Examiner*—Apu Mofiz
*Assistant Examiner*—Charles E Lu
(74) *Attorney, Agent, or Firm*—Vista IP Law Group LLP

(57) ABSTRACT

A method and mechanism of improving performance of database query language statements using data duplication information are described. Information describing data duplication within a data block is maintained. In one embodiment, the data duplication information is used to reduce number of predicate evaluations on data in the data block when a database query language statement is received against the data in the data block. In another embodiment, the data duplication information is used to reduce amount of data accessed by a database query language statement.

63 Claims, 17 Drawing Sheets

U.S. PATENT DOCUMENTS

| | | | |
|---|---|---|---|
| 6,374,266 | B1 | 4/2002 | Shnelvar |
| 6,427,145 | B1 * | 7/2002 | Hara et al. ...................... 707/3 |
| 6,721,751 | B1 * | 4/2004 | Furusho ...................... 707/100 |
| 6,760,907 | B2 | 7/2004 | Shaylor |
| 6,823,329 | B2 * | 11/2004 | Kirk et al. ...................... 707/2 |
| 7,058,783 | B2 | 6/2006 | Chandrasekaran et al. |
| 7,071,999 | B2 | 7/2006 | Lee |
| 7,103,608 | B1 | 9/2006 | Ozbutun et al. |
| 2002/0073298 | A1 | 6/2002 | Geiger et al. |
| 2002/0107988 | A1 | 8/2002 | Jordan |
| 2003/0009595 | A1 | 1/2003 | Collins |
| 2003/0023536 | A1 | 1/2003 | Hollerman et al. |
| 2003/0028509 | A1 | 2/2003 | Sah et al. |
| 2003/0065662 | A1 | 4/2003 | Cosic |
| 2003/0212694 | A1 | 11/2003 | Potapov et al. |
| 2004/0034616 | A1 | 2/2004 | Witkowski et al. |
| 2006/0212672 | A1 | 9/2006 | Chandrasekaran et al. |

OTHER PUBLICATIONS

Bassiouni, M.A., "Data Compression in Scientific and Statistical Databases," *IEEE Transactions on Software Engineering*, (1985), vol. SE-11, No. 10, pp. 1047-1058.

Bayer, R. et al., "Organization and Maintenance of Large Ordered Indexes," *Acta Informat.*, (1972) vol. 1, pp. 173-189.

Beckmann, N. et al., "The R*-Tree: An Efficient and Robust Access Method for Points and Rectangles," *ACM SIGMOD* (1992) pp. 322-331.

Berchtold, S. et al., "The X-Tree: An Index Structure for High-Dimensional Data," *VLDB* (1996), pp. 28-39.

Eggers, S. J. et al., "A Compression Technique for Large Statistical Databases," *VLDB* (1981), pp. 424-434.

Goldstein, J. et al., "Compressing Relations and Indexes," Technical report No. 1355, CS Dept., University of Wisconsin-Madison (1997) pp. 1-23.

Guttman, Antonin, "R-Trees: A Dynamic Index Structure for Spatial Searching," *ACM SIGMOD* (1984), pp. 47-57.

Leutenegger, S.T. et al., "STR: A Simple and Efficient Algorithm for R-Tree Packing," Tech. Report, Mathematics and Computer Science Dept., University of Denver (1996) No. 96-02, pp. 1-29.

Lin, K.I. et al.,The TV-Tree: An Index Structure for High-Dimensional Data, *VLDB journal* (1994), vol. 3 No. 4, pp. 517-542.

Ng, W. K. et al., "Relational Database Compression Using Augmented Vector Quantization," *IEEE 11th International Conference on Data Engineering* (1995), pp. 540-549.

Nievergelt, J. et al, "The Grid File: An Adaptable, Symmetric Multikey File Structure," *Readings in Database Systems*, (1988) Morgan Kaufmann, 582-598.

O'Neil, P. et al., "Improved Query Performance with Variant Indexes," *ACM SIGMOD* (1977), pp. 38-49.

Roth, M.A. et al., "Database Compression," *SIGMOD Record*, (1993) vol. 22, No. 3, pp. 31-39.

Seeger, B. et al., "The Buddy-Tree: An Efficient and Robust Access Method for Spatial Data Base Systems," *VLDB* (1990), pp. 590-601.

Ziv, J., et al, "A Universal Algorithm for Sequential Data Compression," *IEEE Transactions on Information Theory*, (1977) vol. 31, No. 3, pp. 337-343.

Shannon, C.E., "A Mathematical Theory of Communication", The Bell System Technical Journal, vol. 27, pp. 379-423, 623,656, Jul., Oct. 1948, Reprint pp. 1-55.

Westmann, Till et al., "The Implementation and Performance of Compressed Databases", Reihe Informatik, Mar. 1998, 12 pages.

comp.compression Frequently Asked Questions (part 1/3), http://www.faqs.org/faqs/compression-faq/part1/, Last modified: Sep. 5, 1999, pp. 1-65.

comp.compression Frequently Asked Questions (part 2.3), http://www.faqs.org/faqs/compression-faq/part2/, Last-modified Sep. 5, 1999, pp. 1-37.

comp.compression Frequently Asked Questions (part 3/3), http://www.faqs.org/faqs/compression-faq/part3/, Last-modified Feb. 7, 1996, pp. 1-13.

Benveniste et al. "Cache-memory interfaces in compressed memory systems" *IEEE Transactions on Computers* (Nov. 2001) 50(11):1106-1116.

Couchman, J.S. *Oracle Certified Professional™ DBA Certification Exam Guide* Osborne McGraw-Hill, Berkeley, CA (1998) Title page, Copyright page, Table of Contents and pp. 54, 59, 69, 109-111, 125-131, 133, 185, 233, 271, 416, 460, and 503-512 provided.

de Castro et al. "Adaptive compressed caching: Design and Implementation" Proceedings of the 15th Symposium on Computer Architecture and High Performance Computing (Nov. 2003) pp. 10-18.

International Preliminary Examination Report dated Dec. 9, 2004 (PCT/US2003/001484).

* cited by examiner

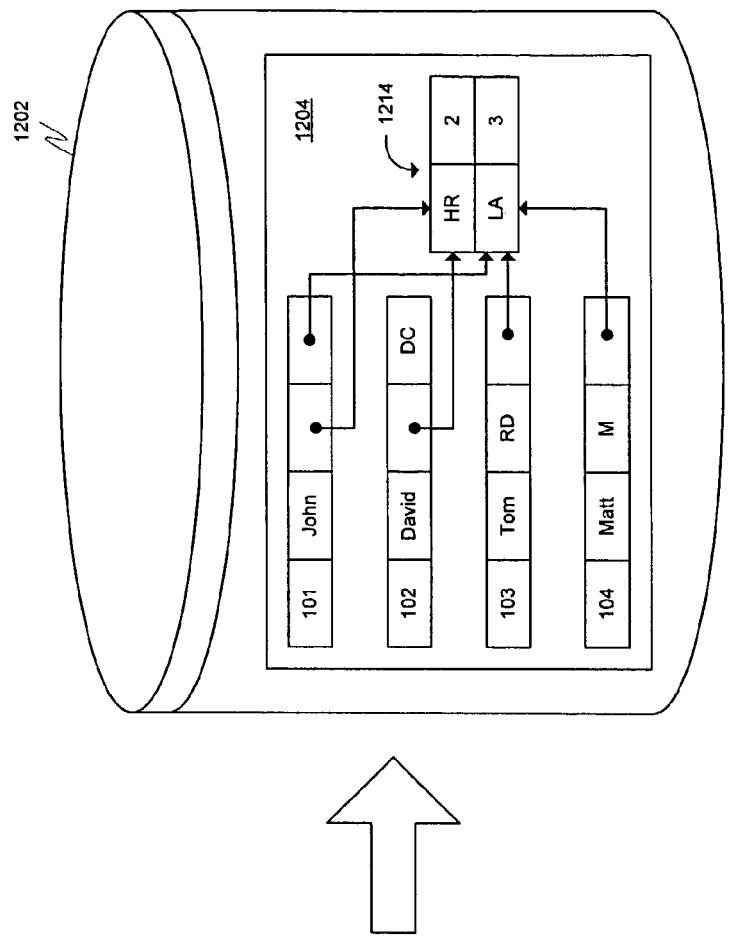
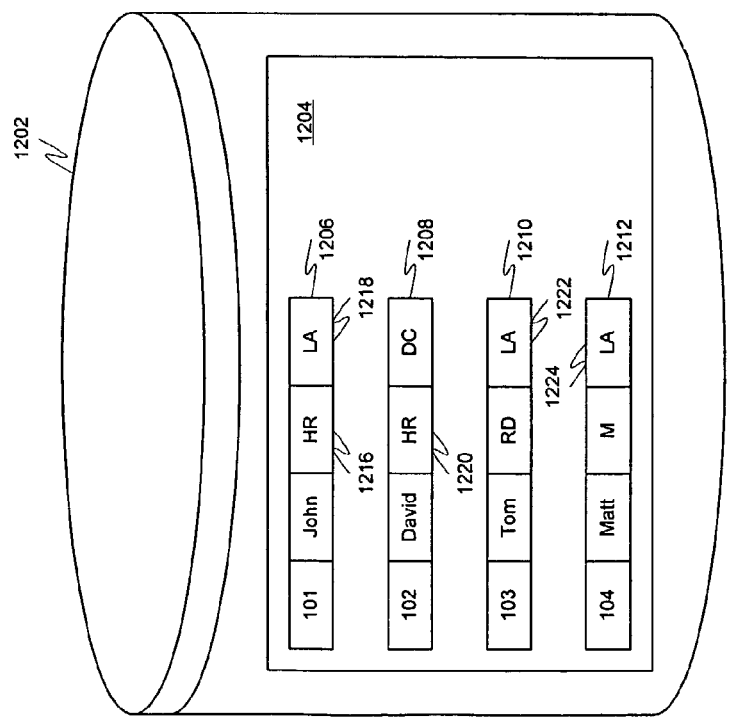
FIG. 12

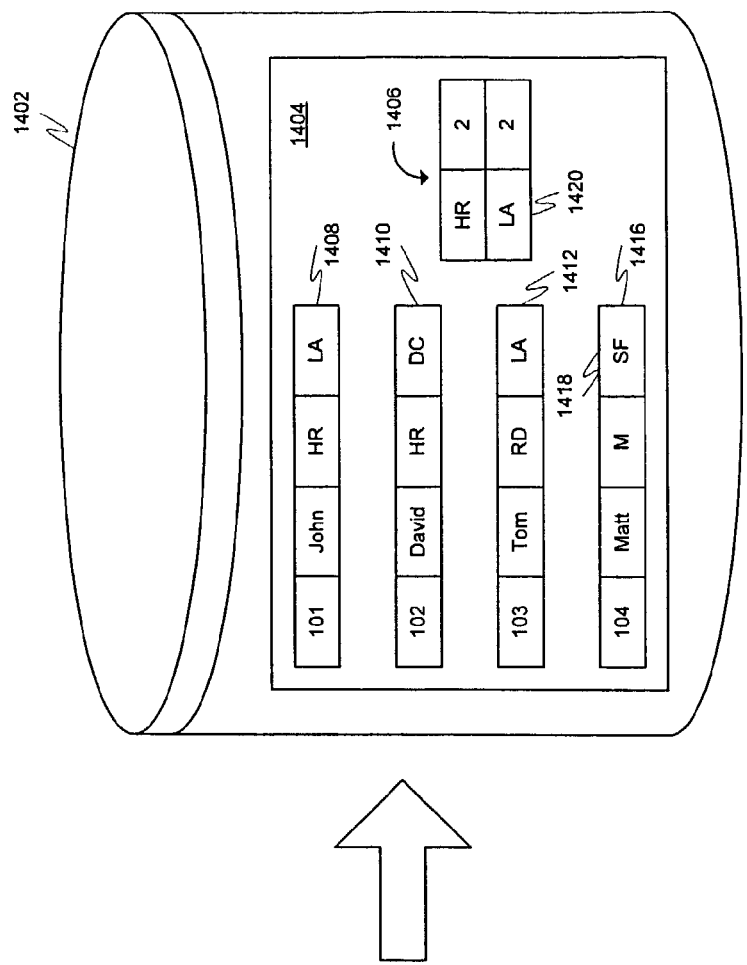
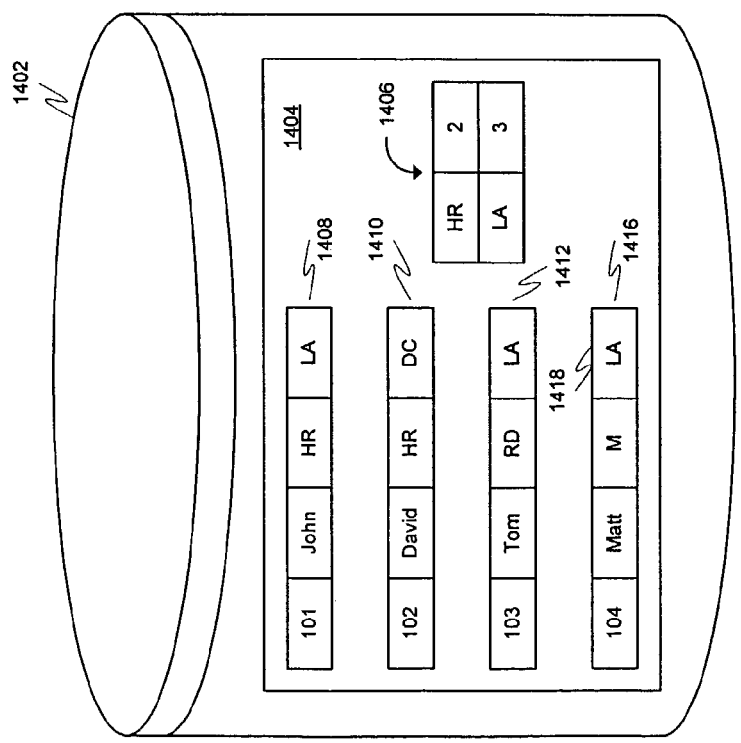
FIG. 14

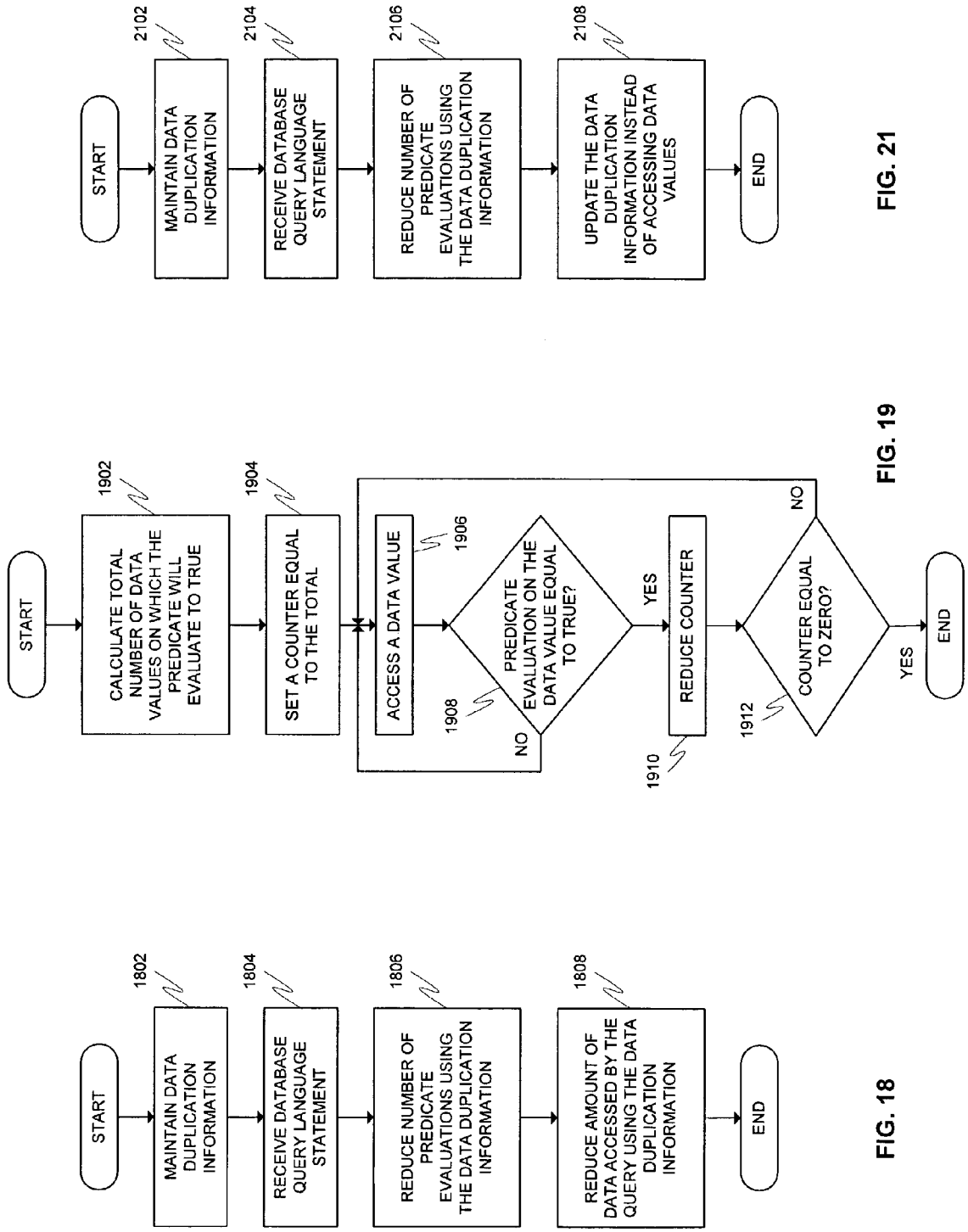

METHOD AND MECHANISM OF IMPROVING PERFORMANCE OF DATABASE QUERY LANGUAGE STATEMENTS USING DATA DUPLICATION INFORMATION

CROSS-REFERENCE TO RELATED APPLICATIONS

This application is a continuation-in-part of U.S. patent application Ser. No. 10/144,689, filed on May 10, 2002, now U.S. Pat. No. 7,103,608, entitled "Method and Mechanism for Storing and Accessing Data," which is incorporated herein by reference in its entirety.

BACKGROUND AND SUMMARY

The present invention is related to the field of database management systems. More particularly, the present invention is directed to a method and mechanism of improving performance of database query language statements.

The quantity of data that must be stored in databases and computer systems is increasing as many modem businesses and organizations increase their need to access greater amounts of information. A significant portion of the expense for storing a large quantity of information is related to the costs of purchasing and maintaining data storage systems. Given this expense, approaches have been suggested to reduce the amount of space that is needed to store a given quantity of data.

Data compression is a technique used in many modem computer systems to reduce the storage costs for data. A common approach for implementing compression is to compress data at the granularity of the file. For example, traditional compression approaches such as the Unix-based gzip or DOS-based zip compress an entire file into a more-compact version of that file. A drawback with this type of approach is that if an entire file is compressed, all or a large part of the file must be decompressed before any part of it can be used, even if only a small part of the file is actually needed by a user. This is a problem that particularly exists with respect to compressing files in database systems, in which a single database file may contain large quantities of database records, but only a small portion of the individual records may be needed at any moment in time. Thus, the granularity of compression or decompression may not realistically match the granularity at which data is desirably used and accessed in the system.

However, compression at other granularities may result in storage inefficiencies. For example, certain page-at-a-time compression approaches may lead to compressed pages of different sizes that are inefficiently mapped onto physical pages. In addition, many traditional compression techniques do not even guarantee that data size will not increase after compression.

Moreover, the very acts of compressing and decompressing data could consume an excessive amount of overhead. The overhead is typically related to the specific compression algorithm being used as well as the quantity of data being compressed or decompressed. This overhead could contribute to significant latency when seeking to store, retrieve, or update information in a database system. For example, some compression techniques store compression information separate from the compressed data. Hence, for a simple read access, multiple locations in the database may need to be accessed and expensive decompression operations may need to be performed.

Given the latency problems, as well as less-than-certain compression gains, the trade-off between time and space for compression is not always attractive in a database or other type of computing system. Hence, there is a need for a compression technique that not only results in the reduction of disk space used, but also has no negative impact on the performance of database query language statements against compressed data.

The present invention provides a method and mechanism of storing and retrieving data in a compressed format. In one embodiment, data compression is performed on stored data by reducing or eliminating duplicate data values in a data block or other storage unit. In another embodiment, information describing data duplication within the data block is maintained. The present invention also provides a method and mechanism of improving performance of database query language statements. In one embodiment, data duplication information maintained is maintained and used to reduce number of predicate evaluations. In another embodiment, the data duplication information is used to reduce amount of data accessed by a database query language statement.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

FIG. 12 illustrates maintaining data duplication information according to one embodiment of the invention.

FIG. 14 illustrates updating data duplication information according to one embodiment of the invention.

FIG. 18 shows a process flow of a method of improving performance of database query language statements according to another embodiment of the invention.

FIG. 19 depicts a process of reducing the amount of data accessed by a database query language statement according to an embodiment of the invention.

FIG. 21 illustrates a flow chart of a method of improving performance of database query language statements according to a further embodiment of the invention.

DETAILED DESCRIPTION

Storing and retrieving data from a data storage system is disclosed. Rather than compressing data at the file level or some other granularity, which may lead to storage inefficiencies and/or increased execution time of database query language statements, data compression is achieved by reducing or eliminating duplicate values in a data block or other storage unit. Improving performance of database query language statements is also disclosed. By maintaining information describing data duplication within data blocks, which previously had to be recomputed every time a block was accessed, the data duplication information can be used to improve performance of database query language statements.

Database query language statements are often used to create, search, access, retrieve, modify, organize, maintain, manipulate, define, control, add, and/or delete data and structures within databases. One popular database query language is known as the Structured Query Language (SQL). For purposes of explanation only, and not by way of limitation, the following description is made with particular reference to database statements involving SQL.

The term "disk" or "disk system," which is used throughout this document, refers to data storage systems. The inventive concepts disclosed herein may also be applied to other types of storage systems besides disk-based systems. In addition, the following description will be made with respect to the storage or retrieval of relational data from a database. It is noted, however, that the present invention is applicable to managing other types and granularities of data in a computing system, and thus is not to be limited to compression of relational data.

According to an embodiment of the invention, an identification is made of duplicated values within a set of data that is to be stored within a particular data storage unit. Instead of writing all of these duplicated data values to the data storage unit, a symbol table is created to store one copy of each duplicated data value. Each occurrence of a duplicated data value is configured to reference the corresponding duplicated data value in the symbol table.

As illustrated herein, the data storage units are shown as data blocks or disk pages. However, other data storage units may also be used. In one embodiment, data blocks are self-contained, e.g., the information that is needed to recreate the uncompressed data in a data block is available within the block.

Figure 1:
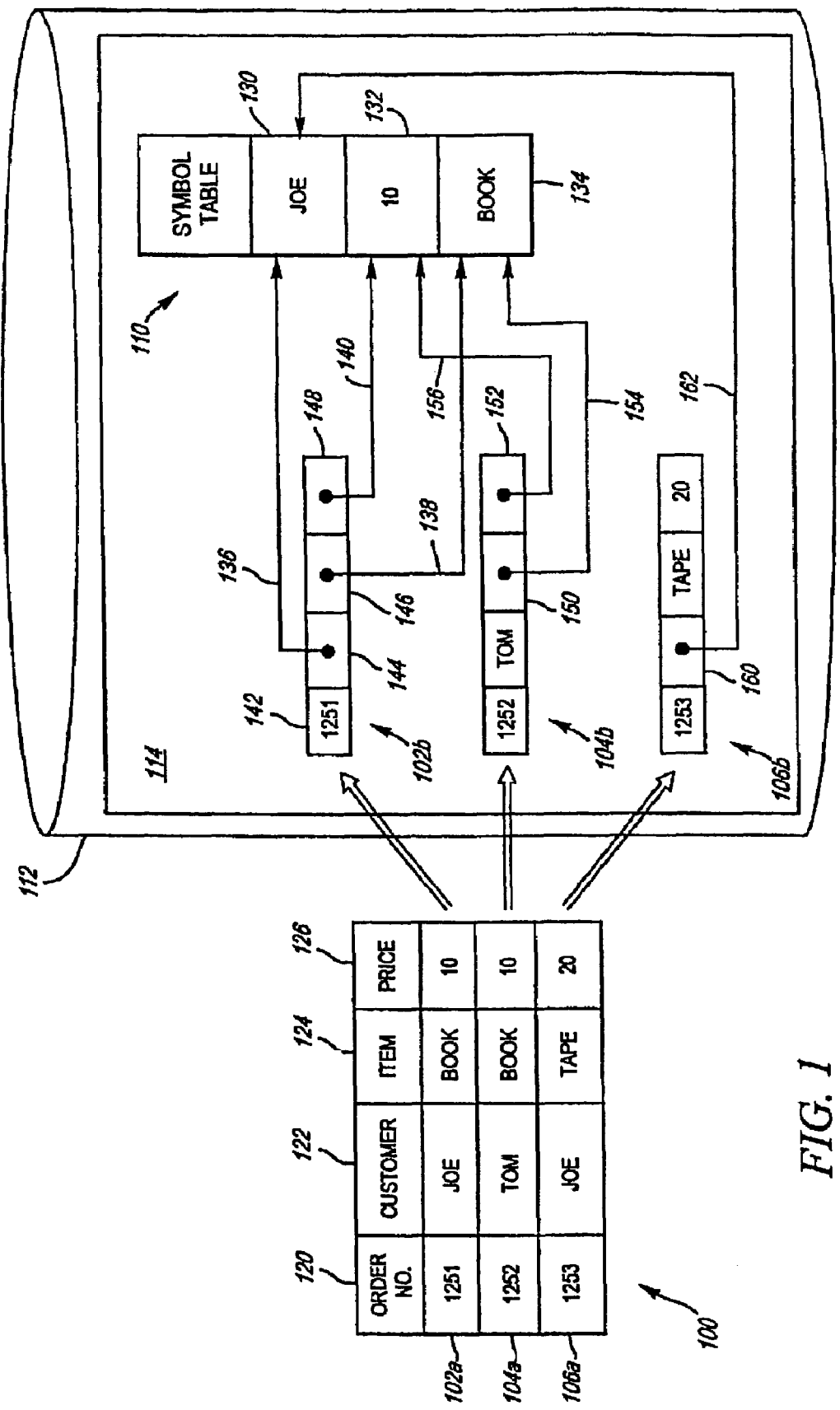
FIG. 1 shows a data storage structure according to an embodiment of the invention.

FIG. 1 shows a database table 100 that is to be stored into a block 114 on disk 112. Each row in table 100 includes four columns of information, including an order number column 120, a customer column 122, an item column 124, and a price column 126. Three rows of data are shown in table 100. Row 102a has the value "1251" in order number column 120, the value "Joe" in customer column 122, the value "Book" in item column 124, and the value "10" in price column 126. Row 104a has the value "1252" in order number column 120, the value "Tom" in customer column 122, the value "Book" in item column 124, and the value "10" in price column 126. Row 106a has the value "1253" in order number column 120, the value "Joe" in customer column 122, the value "Tape" in item column 124, and the value "20" in price column 126.

It is noted that the value "Joe" is repeated in customer column 122 for both rows 102a and 106a. Similarly, the value "Book" is repeated in item column 124 for rows 102a and 104a. The value "10" is repeated in price column 126 for rows 102a and 104a.

A symbol table 110 is created to store each duplicated data value. In particular, the duplicated value "Joe" is stored in symbol table entry 130, the duplicated value "10" is stored in symbol table entry 132, and the duplicated value "Book" is stored in symbol table entry 134.

When each row of data in table 100 is stored to block 114 on disk 112, the repeated data values are not again written to disk. Instead, corresponding portions of each row are configured to reference the appropriate symbol table entry in symbol table 110 that contains the correct data value, e.g., using pointer or linking structures.

To illustrate, consider row 102a in table 100. Row 102a includes the following column values: "1251", "Joe", "Book", and "10". It is noted that symbol table 110 includes entries for the "Joe", "Book", and "10" values, which are the duplicated data values in table 100 that appear in row 102a.

As row 102a is written to disk, only the unique value "1251" is individually written to disk. This is shown in on-disk row structure 102b, which corresponds to row 102a in table 100. On-disk row structure 102b includes a first portion 142 corresponding to order number column 120 in row 102a, which includes the unique data value "1251".

For duplicated data values, pointers or links may be inserted into the appropriate portions of the on-disk row structure to point to the appropriate entry in the symbol table 110. On-disk row structure 102b includes a portion 144 corresponding to customer column 122 in row 102a that is configured to include a pointer 136 to symbol table entry 130, which matches the duplicated data value "Joe" in customer column 122 of row 102a. On-disk row structure 102b also includes a portion 146 corresponding to item column 124 in row 102a that is configured to include a pointer 138 to symbol table entry 134, which matches the duplicated data value "Book" in item column 124 of row 102a. On-disk row structure 102b further includes a portion 148 corresponding to price column 126 in row 102a that is configured to include a pointer 140 to symbol table entry 132, which matches the duplicated data value "10" in price column 126 of row 102a.

Rows 104a and 106a in table 100 are each similarly represented when stored into block 114 on disk 112. Thus, row 104a in table 100 is written to disk as on-disk row structure 104b. The unique data values of row 104a—"1252" and "Tom"—are individually written into on-disk row structure 104b. Row 104a also includes duplicated row values "Book" and "10" in columns 124 and 126, respectively. Portion 150 of on-disk row structure 104b corresponding to column 124 in row 104a is configured to include a pointer 154 to entry 134 in symbol table 110, which matches the duplicated data value "Book". Portion 152 of on-disk row structure 104b corresponding to column 126 in row 104a is configured to include a pointer 156 to entry 132 in symbol table 110, which matches the duplicated data value "10".

Row 106a in table 100 is written to disk as on-disk row structure 106b. In row 106a, the unique data values are "1253", "Tape", and "20", which are individually written into on-disk row structure 106b. Row 106a also includes the duplicated row value "Joe" in column 122. Portion 160 of on-disk row structure 106b corresponding to column 122 in row 106a is configured to include a pointer 162 to entry 130 in symbol table 110, which matches the duplicated data value "Joe".

Figure 2:
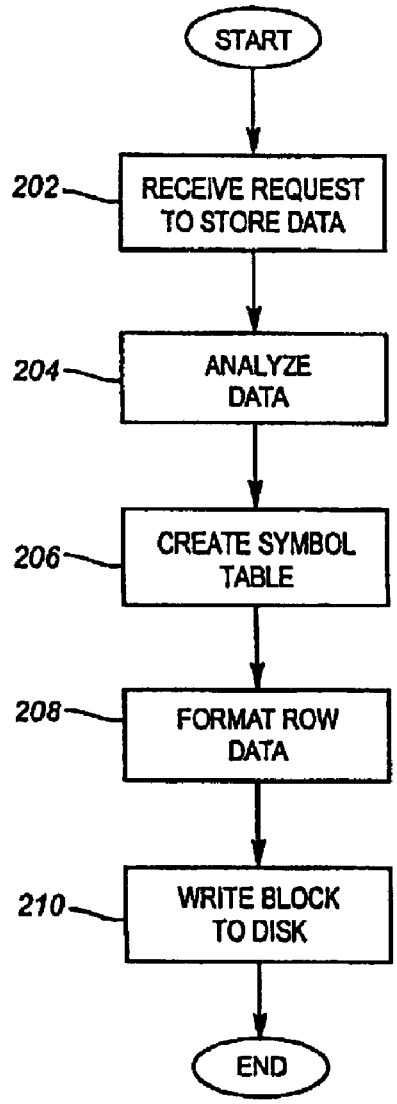
FIG. 2 shows a flowchart of an embodiment of a process for storing data.

FIG. 2 shows a flowchart of an embodiment of a process for storing data onto disk. At 202, a request is received to store data onto disk. In an embodiment, whether the data is compressed is an option selected by a user or system. If compression is selected, at 204, the data is analyzed to identify repetitive data values for the portions of the data that is to be stored within a given data block. Based upon the identified data duplicates, a symbol table is created that includes some or all of the duplicate data values (206). Each on-disk row structure in the data block is thereafter created. The on-disk row structures are formatted to exclude some or all of the duplicated data values (208) and are finally written to the disk (210). In particular, on-disk row structures that are associated with a duplicated data value are configured to reference the appropriate entry or entries in the symbol table that stores the relevant data value.

If the compression approach is performed off-line, then the analysis and formatting of rows are performed in batch mode, such that the entire contents of a database block is pre-organized before writing to disk. Off-line processing allows precise determination of the number of rows that will fit into a given data block. Alternatively, the compression approach can be performed on-line, with each on-disk row structure individually prepared and written to disk. In either case, the block metadata is configured to indicate whether the data in the block, or portions of the data in the block, have been compressed. In an embodiment, the header of the block includes a data structure that indicates whether the block or data in the block is compressed. In one embodiment, a single bit is sufficient to indicate whether data in the block is compressed.

Figure 9:
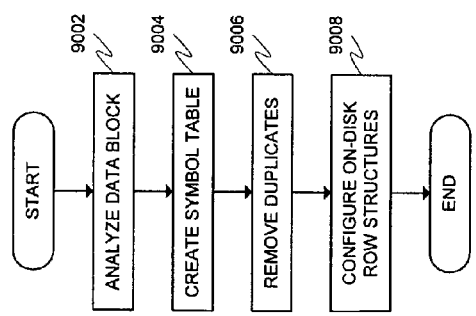
FIG. 9 shows a process of transforming an uncompressed data block into a compressed data block according to one embodiment of the invention.

In another embodiment, rather than compressing data as it is loaded into a data block, an uncompressed data block may be transformed into a compressed data. As shown in FIG. 9, a data block is analyzed to identify duplicated data values (9002). Based upon the identified data duplicates, a symbol table is created that includes some or all of the duplicated data values (9004). Some or all of the duplicates of the data values in the symbol table are removed or deleted from the data block (9006). On-disk row structures in the data block are then configured to reference the appropriate entry or entries in the symbol table that stores the relevant data value(s) (9008).

If the likelihood of data repetition within a single block is low, the expected compression ratio is also likely to be low. If the likelihood of such repetition is higher, the expected compression ratio will be higher. Thus, rows can be reorganized to increase the likelihood of such repetitions. One way to do this for a single column table is to order table rows by the column value. This can be achieved in the Structured Query Language (SQL) by executing the statement "CREATE TABLE AS SELECT" with an order by clause. This type of technique can also be applied to a table where one column has low cardinality and other columns have high cardinalities, by ordering table rows by low cardinality column.

For a table with multiple low cardinality columns, tuning to achieve a better compression ratio can be performed by first determining the column with the lowest cardinality. The cardinality of a column can be determined by executing the statement "SELECT COUNT(DISTINCT(c)) from T;". Once the lowest cardinality column is determined (assume it is column C1), the cardinalities of other columns for fixed values of the chosen column are determined. This can be measured by executing the statement "SELECT SUM(count (*)* COUNT(DISTINCT(cK))) from T group by C1;" for all columns cK other than C1. Assume column C2 has the lowest such measure. The column with the lowest cardinality when the first two columns are fixed is then determined. This can be measured by executing the statement "SELECT SUM(count (*)* COUNT(DISTINCT(cK))) from T group by C1, C2;" for all columns cK other than C1 and C2. By continuing this process, one would determine some column sequence C1, C2, ..., Cn. This sequence can be used as the sequence of columns in the ORDERED BY clause of the create table compress statement.

Figure 3:
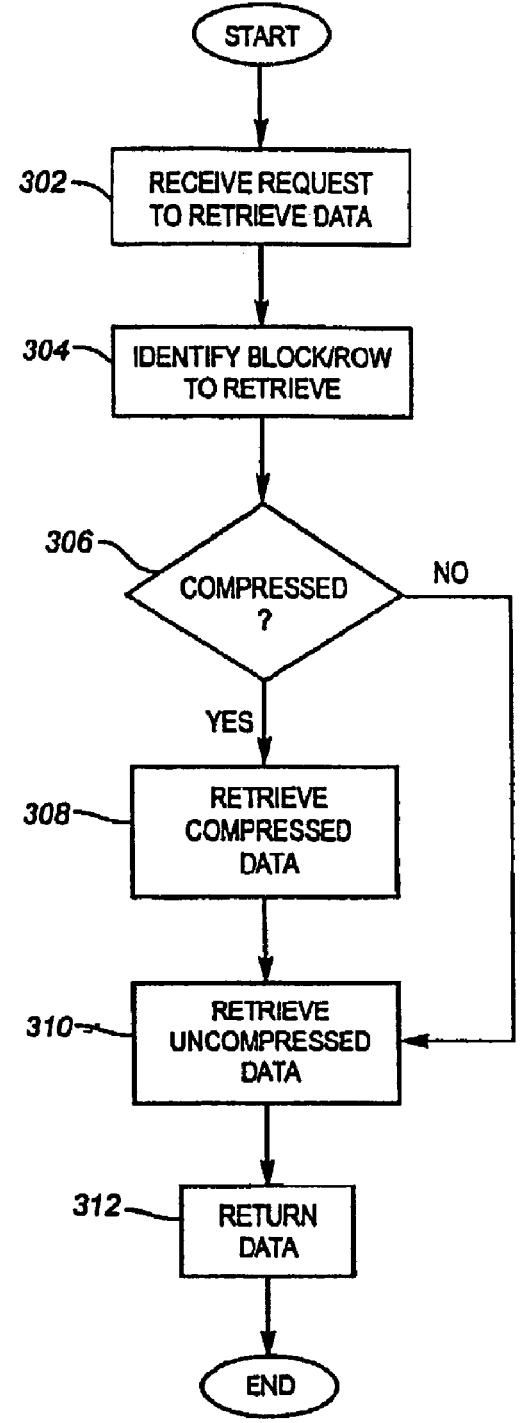
FIG. 3 shows a flowchart of an embodiment of a process for retrieving data.

FIG. 3 shows a flowchart of an embodiment of a process for retrieving data from disk. At 302, a request is received to retrieve data from disk. The specific block or row that is being sought is identified at 304. Any conventional indexing or search techniques may be employed to perform operation 304. At 306, a determination is made whether the relevant database block is being stored in compressed format. In an embodiment, the block header is accessed to make this determination. If the block is not compressed, then the requested row information is immediately retrieved from disk (310) and returned to the requesting entity (312). If the block is compressed, then the relevant on-disk row structure for the requested row is accessed to retrieve duplicated data values from the symbol table (308). In addition, the individually stored data values from the on-disk row structure is also retrieved (310). At 312, the complete set of requested data is returned to the requesting entity.

Figure 4:
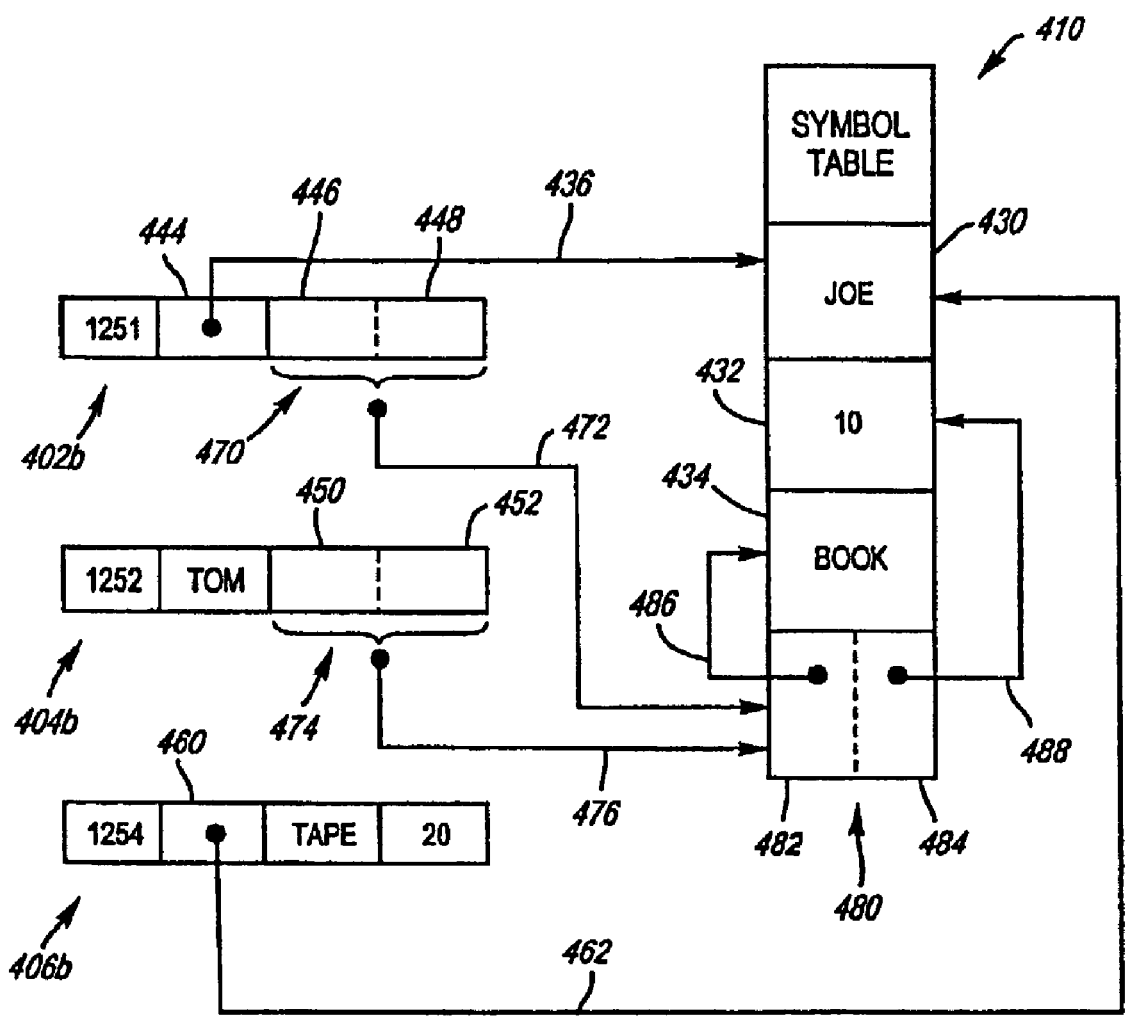
FIG. 4 illustrates recursive referencing of entries in a symbol table according to an embodiment of the invention.

Recursive symbol entries may be used in the symbol table. A recursive symbol entry is an entry in the symbol table that itself references one or more other symbol table entries. FIG. 4 illustrates the use of recursive symbol entries to format a data block to store table 100 of FIG. 1. Like symbol table 110 of FIG. 1, recursive symbol table 410 includes an entry 430 to store the "Joe" data value, an entry 432 to store the "10" data value, and an entry 434 to store the "Book" data value.

Unlike symbol table 110 of FIG. 1, recursive symbol table 410 includes a recursive symbol table entry 480 that references other entries within symbol table 410. In particular, recursive symbol table entry 480 includes a first portion 482 that is associated with a link 486 to the data value "Book" in entry 434. Recursive symbol table entry 480 also includes a second portion 484 that is associated with a link 488 to the data value "10" in entry 432. By combining first portion 482 and second portion 484, entry 480 logically creates an entry that includes both referenced data values in sequence, i.e., having the data value of "Book" directly before the data value "10".

One advantage of combining multiple entries in this manner is that there are sequences of column values for rows stored in the block that may match these combinations. Rather than having multiple links or pointer structures between an on-disk row structure and the individual data values in a symbol table, a single link or pointer structure can be used to point to a combined entry that recursively links to multiple other entries.

Referring to table 100 in FIG. 1, columns 124 and 126 in both row 102a and row 104a present the data values "Book" and "10" in sequence. In FIG. 1, on-disk row structure 102b (which corresponds to row 102a) includes a link 138 to the data value "Book" and a separate link 140 to the data value "10". Similarly, on-disk row structure 104b (which corresponds to row 104a) includes a link 154 to the data value "Book" and a separate link 156 to the data value "10". This is a total of four links from these on-disk row structures to entries in symbol table 110.

In the recursive approach of FIG. 4, the on-disk row structure 402b (which corresponds to row 102a) includes a single link 472 to the combined, sequential data values "Book" and "10" represented by recursive symbol table entry 480. This allows the values of both portions 446 and 448 in on-disk row structure 402b (corresponding to columns 124 and 126 in row 102a) to be represented with a single link or pointer structure. Similarly, on-disk row structure 404b (which corresponds to row 104a) includes a single link 476 to the combined, sequential data values "Book" and "10" represented by recursive symbol table entry 480. Again, this allows the values of both portions 450 and 452 in on-disk row structure 404b (corresponding to columns 124 and 126 in row 104a) to be represented with a single link or pointer structure. The end result is that the approach of FIG. 4 requires fewer links or pointers between the on-disk row structure and the symbol table than is required by the approach of FIG. 1.

The approach of FIG. 4 to reduce the number of links or pointers may also be employed with non-recursive combinational entries in symbol table 410. In particular, entry 480 can be configured such that portion 482 explicitly stores the data value "Book", rather than being associated with a recursive link 486 to entry 434. Portion 484 of entry 480 can also be configured to explicitly store the data value "10", rather than being associated with a recursive link 488 to entry 432. This approach still allows a reduction in the number of links between the on-disk row structure and symbol table 410, but at the cost of possibly increasing the amount of disk space needed to explicitly store the duplicated data values in symbol table 410. Entries in symbol table 410 may also include various combinations of recursive links and explicitly stored data values. While the example of FIG. 4 shows only two data values combined into a recursive symbol entry 480, the inventive concepts can be extended to include any number of data values in a combined symbol table entry.

In one embodiment, column reordering may be performed to improve compression ratios. As noted in the last section, if there are repeating sequences of column values for rows stored in a given block, then the number of links between the symbol table and on-disk row structures can be reduced by creating links to combined entries in the symbol table. Column reordering can be performed to increase the number of duplicated sequences of column values. In an embodiment, column reordering is performed at the granularity level of the data block. Alternatively, column reordering can be performed at other granularities, e.g., across multiple blocks.

Figure 5:
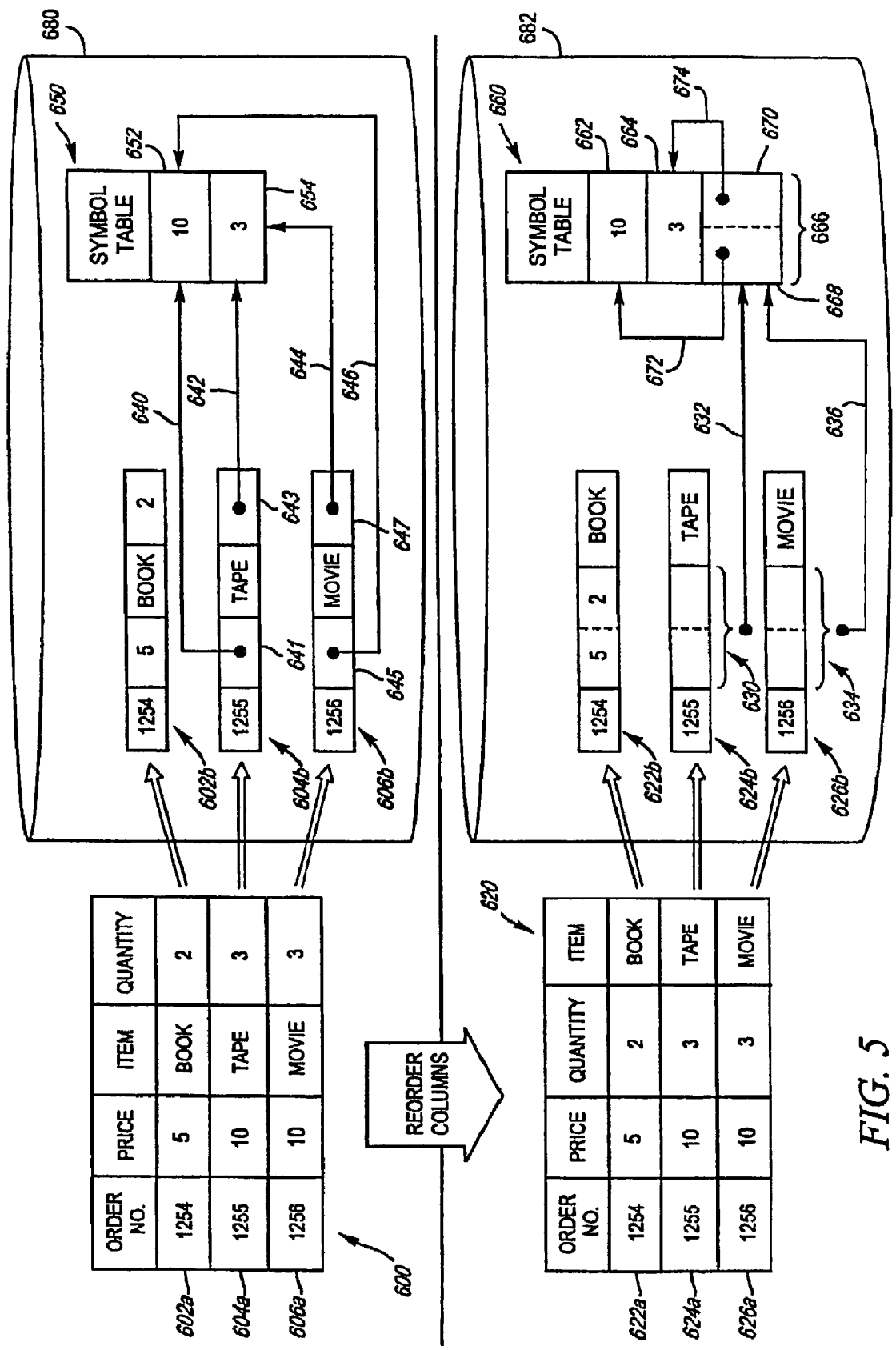
FIG. 5 illustrates column reordering and recursive referencing of entries in a symbol table according to an embodiment of the invention.

To illustrate, consider database table 600 shown in FIG. 5. Table 600 includes three rows of data, with each row having an Order Number column, a Price column, an Item column, and a Quantity column. Row 602a has the following sequence of data values: "1254", "5", "Book", and "2". Row 604a has the following sequence of data values: "1255", "10", "Tape", and "3". Row 606a has the following sequence of data values: "1256", "10", "Movie", and "3".

Consider the first situation if columns are not reordered. It is noted that the data values "10" and "3" are duplicated among these rows. Thus, when this table is written to disk 680, a symbol table 650 can be created having a first entry 652 with the data value "10" and a second entry 654 with the data value "3". As rows 602a, 604a, and 606a are written to disk, each on-disk row structure for these rows that is associated with these duplicated data values are configured to reference the appropriate entry in symbol table 650. Thus, on-disk row structure 604b, which corresponds to row 604a, has a portion 641 (corresponding to the data value in the Price column) that is associated with a link 640 to entry 652 in symbol table 650 for the data value "10". On-disk row structure 604b also has a portion 643 (corresponding to the data value in the Quantity column) that is associated with a link 642 to entry 654 in symbol table 650 for the data value "3". On-disk row structure 606b, which corresponds to row 606a, has a portion 645 (corresponding to the data value in the Price column) that is associated with a link 646 to entry 652 in symbol table 650 for the data value "10". On-disk row structure 606b also has a portion 647 (corresponding to the data value in the Quantity column) that is associated with a link 644 to entry 654 in symbol table 650 for the data value "3". Because row 602a does not include any of the duplicated data values, its associated on-disk row structure 602b explicitly stores each column value and does not include any reference to the symbol table.

Consider if column reordering is performed against table 600. The column reordering is performed to increase the possibility of repeating sequences of column values for the rows in the table. In the present example, by switching the ordering between the Item column and the Quantity column in table 600, it can be seen that a repeating sequence of values is created between the Price column and the Quantity column. The result of this column reordering is shown as table 620 in FIG. 5. In particular, both rows 624a and 626a now have the same sequence of data values "10" and "3" for the Price and Quantity columns. Thus, when symbol table 660 is created on disk 682, a combined entry 666 can be inserted that includes, whether directly or indirectly, the data values "10" and "3" in the sequence shown in table 620 for rows 624a and 626a. If combined entry 666 indirectly includes these values, then entry 666 includes a first portion 668 that recursively references entry 662 and a second portion 670 that recursively references entry 664.

When row 624a is written to disk, its on-disk row structure 624b is associated with a single link 632 to combined entry 666 for the sequence of values "10" and "3". This is in contrast to the approach taken by on-disk row structure 604b for the same row without column reordering, which uses two links 640 and 642 to reference the same two data values. Likewise, when row 626a is written to disk, its on-disk row structure 626b is associated with a single link 636 for the sequence of values "10" and "3". Again, this is in contrast to the approach taken by on-disk row structure 606b for the same row without column reordering, which uses two links 646 and 644 to reference the same two data values.

Figure 6:
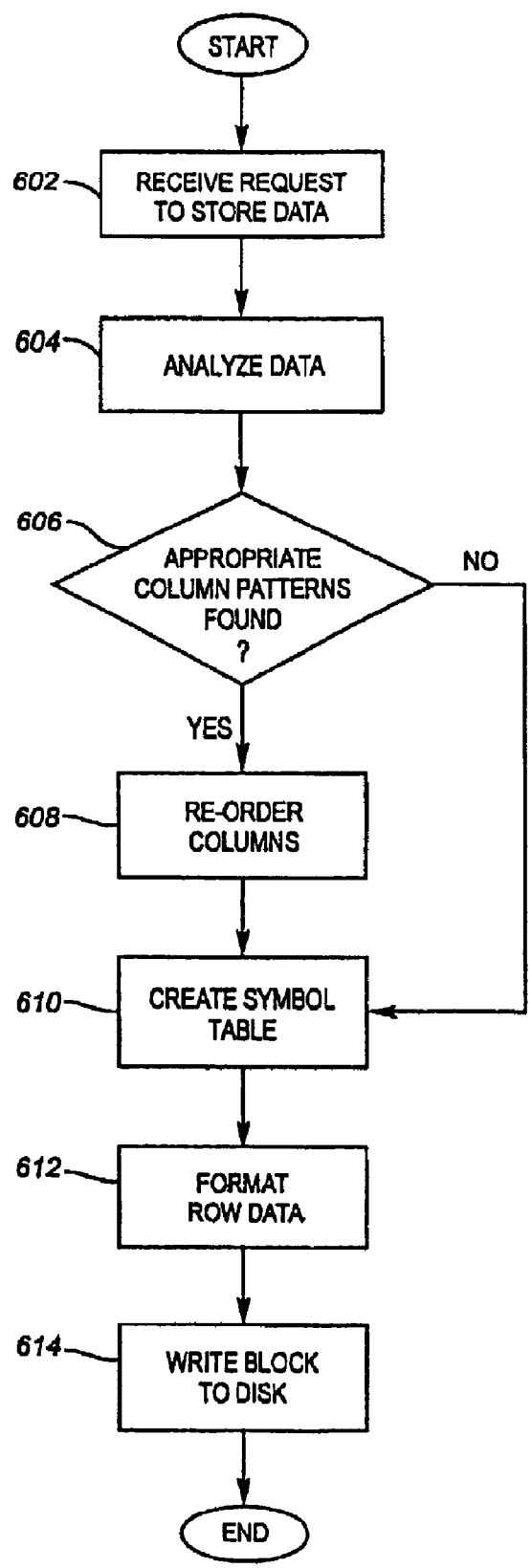
FIG. 6 shows a flowchart of an alternate embodiment of a process for storing data.

FIG. 6 shows a flowchart of an embodiment of a process for storing data to disk utilizing column reordering. At 602, a request is received to store data onto disk. If compression is turned on, at 604, the data is analyzed to identify repetitive data values for the portions of the data that is to be stored within a given data block. The data analysis also includes an analysis of possible column reordering combinations that may be performed to increase the likelihood of repeating sequences of data values. A determination is made whether there exists column sequences that may be advantageously obtained through column reordering (606). If so, then the appropriate columns are reordered (608). Based upon the identified data duplicates, a symbol table is created to include some or all of the duplicated data values (610). Each on-disk row structure in the database block is thereafter created and formatted to exclude the duplicated data values (612) and are written to disk (614). In particular, each on-disk row structure that is associated with a duplicated data value is configured to include or reference a link to the appropriate entry or entries in the symbol table that stored the relevant data value. The block metadata is configured to indicate whether the data in the block, or portions of the data in the block, have been compressed. In addition, the block metadata is also configured to indicate whether and how column reordering was performed to the stored data. In an embodiment, the header of the block includes a data structure that indicates whether the block or data in the block are compressed and/or reordered. When the data is retrieved from the block, the header information is accessed to allow the data to be reordered and uncompressed back to its original form.

An optimization that can be applied is to remove trailing NULL values from the on-disk versions of stored rows. Rows in a database table may include NULL values in the one or more columns at the end of the row. When these rows are written to disk, additional compression can be achieved by not allocating or writing any space to disk for these NULL values. Instead, the storage system is configured to recognize that if the on-disk version of a particular database row does not include one or more stored values for columns at the end of the row, then those column values are assumed to be NULL values.

Figure 7:
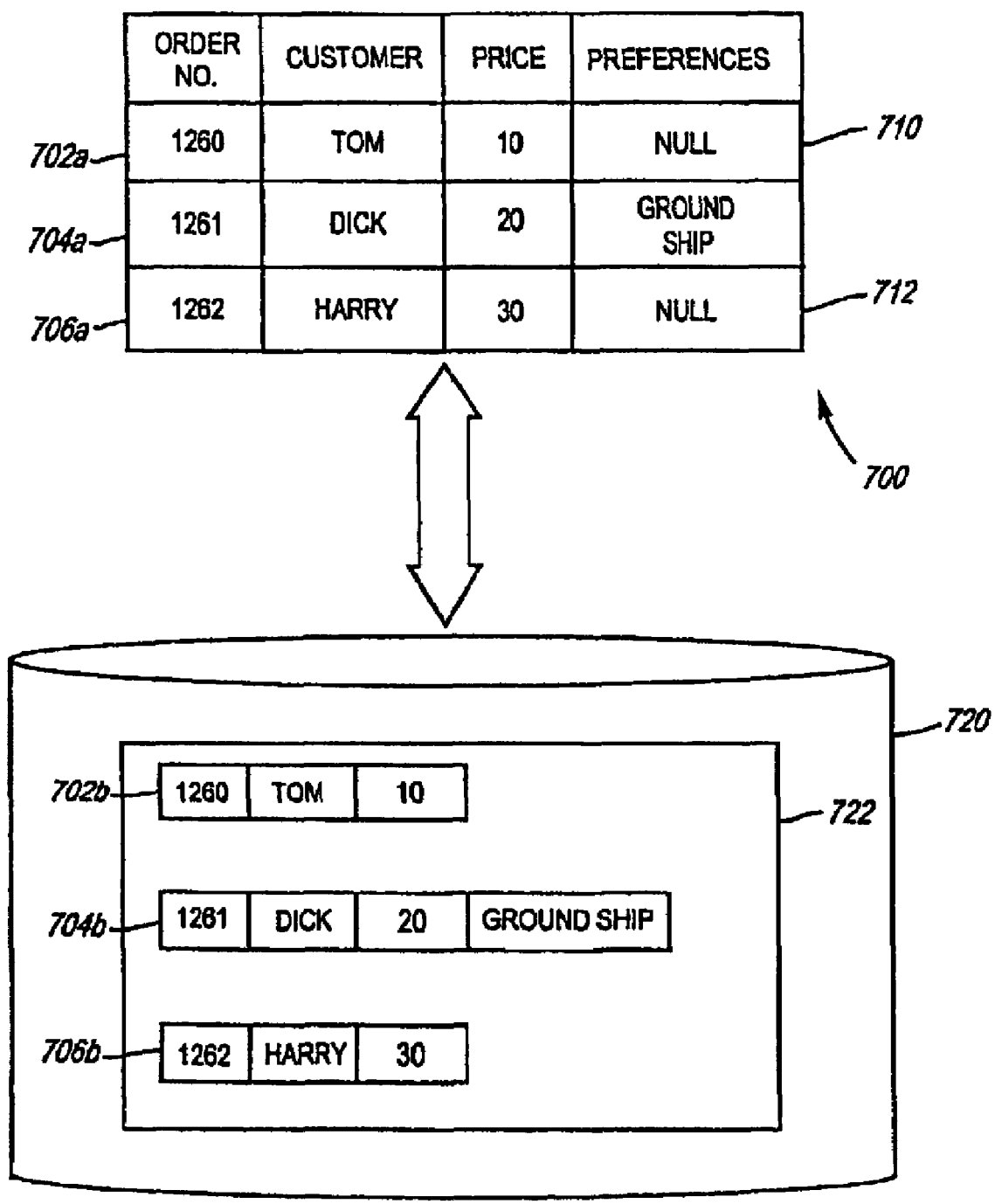
FIG. 7 illustrates removal of trailing NULL values according to an embodiment of the invention.

To illustrate, consider table 700 in FIG. 7, which is to be stored to block 722 on disk 720. It is noted that rows 702a and 706a both have a NULL value in the last column of the row. When these rows are written to disk 720, the on-disk row structures for these rows are configured to exclude the trailing NULL values. On-disk row structure 702b, which corresponds to row 702a, does not contain a space allocated for the trailing NULL value in the Preferences column. Instead, it only includes allocated space for the leading "1260", "Tom", and "10" values that appear in row 702a. On-disk row structure 706b, which corresponds to row 706a, does not contain a space allocated for the trailing NULL value. Instead, it only includes allocated space for the leading "1262", "Harry", and "30" values that appear in row 706a.

Column reordering can be performed to increase the likelihood of trailing NULL values appearing in rows to be stored on disk. The column values for a set of data is analyzed to sort the columns based upon the number of NULL values in each column. The columns are reordered so that the columns with the larger number of NULL values are ordered to the end of the rows, and the columns with the smaller number of NULL values are ordered closer to the beginning of the rows. Thus, the columns with the largest number of NULL values may be reordered to the end of the table. The column with the next-largest number of NULL values may be reordered as the second-to-last column of the table, with these sequences of actions continued until an efficient ordering of columns is achieved.

Figure 8:
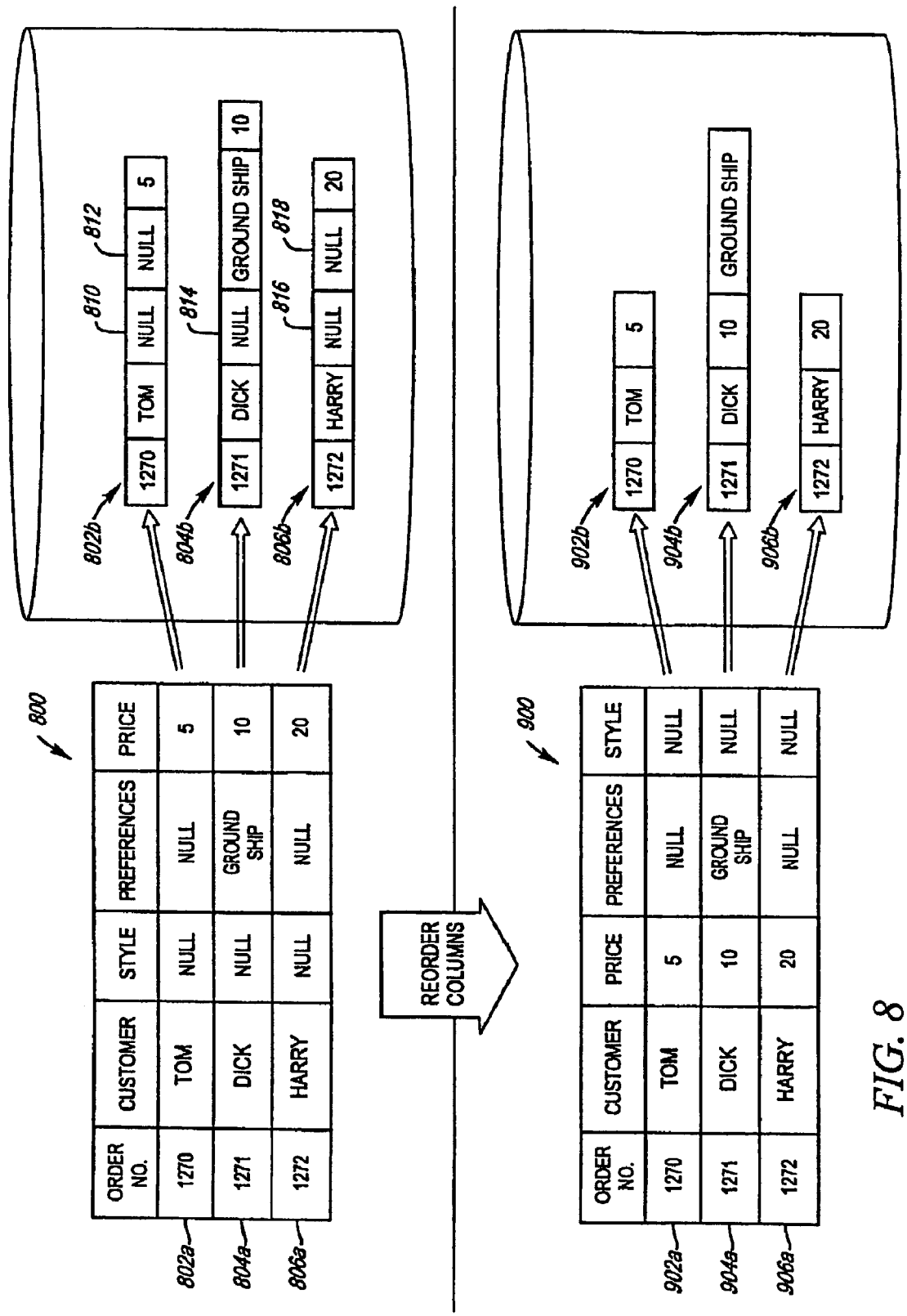
FIG. 8 illustrates column reordering and removal of trailing NULL values according to an embodiment of the invention.

To illustrate possible inefficiencies if column reordering is not performed, reference is made to table 800 in FIG. 8. Table 800 includes a set of rows 802a, 804a, and 806a that is to be written to disk. Each row includes one or more NULL values. Rows 802a and 806a includes NULL values in the Style column and Preferences column. Row 804a includes a NULL value in the Style column. Since none of the NULL values in these rows are trailing NULLs, when these rows are written to disk, space may be wasted in each corresponding on-disk row structure because of the NULL values.

As shown, on-disk row structure 802b, which corresponds to row 802a, includes two spaces 810 and 812 that have been allocated for the NULL values corresponding to the values in the Style and Preferences columns for row 802a. On-disk row structure 804b, which corresponds to row 804a, includes a space 814 that has been allocated for the NULL value corresponding to the value in the Style column of row 804a. On-disk row structure 806b, which corresponds to row 806a, includes two spaces 816 and 818 that have been allocated for the NULL values corresponding to the values in the Style and Preferences columns for row 806a.

Column reordering can be performed to increase the compression efficiency of storing table 800 to disk. The first step is to sort the columns to identify specific columns having larger numbers of NULL values. Here, it can be seen that the Style column in table 800 has the largest number of NULL values (with NULL values for every row). The Preferences column has the next largest number of NULL values (with NULL values in rows 802a and 806a). None of the other columns include NULL values.

The columns are reordered to place the columns with the larger number of NULL values closer to the end of the rows. Table 900 illustrates the result of performing this action on table 800. In particular, the columns are reordered such that the Style column, which has the largest number of NULL values, is placed at the end of the rows. The Preferences column, which has the next largest number of NULL values, is placed second-to-last in the sequence of columns. None of the other columns are reordered since they do not contain NULL values.

This type of reordering has maximized the number of trailing NULL values in the table. Now rows 902a and 906a, which correspond to rows 802a and 806a, respectively, in table 800, both include two trailing NULL values. Rows 802a and 806a did not contain any trailing NULL values. Row 904a in table 900, which corresponds to row 804a in table 800, includes one trailing NULL value. Row 804a did not contain any trailing NULL values.

When rows 902a, 904a, and 906a in table 900 are written to disk, the trailing NULL values can be removed from the on-disk versions of each row. Thus, on-disk row structure 902b, which corresponds to row 902a in table 900, excludes the NULL values for the Preferences and Style columns. On-disk row structure 902b only includes three fields to store the data values "1270", "Tom", and "5" for the Order Number, Customer, and Price columns, respectively. In contrast, on-disk row structure 802b, which is its equivalent prior to column reordering, includes five fields to store the data values "1270", "Tom", "NULL", "NULL", and "5" for the Order Number, Customer, Style, Preferences, and Price columns, respectively.

On-disk row structure 904b, which corresponds to row 904a in table 900, excludes the NULL value for the Style column. On-disk row structure 904b only includes four fields to store the data values "1270", "Dick", "10", and "Ground Ship" for the Order Number, Customer, Price, and Preferences columns, respectively. In contrast, on-disk row structure 804b, which is its equivalent prior to column reordering, includes five fields to store the date values "1270", "Dick", "NULL", "Ground Ship", and "10" for the Order Number, Customer, Style, Preferences, and Price columns, respectively.

Like on-disk row structure 902b, on-disk row structure 906b, which corresponds to row 906a in table 900, excludes the NULL values for the Preferences and Style columns. On-disk row structure 906b only includes three field to store the data values for the Order Number, Customer, and Price columns. In contrast, on-disk row structure 806b, which is its equivalent before column reordering, includes five fields to store the data values for the Order Number, Customer, Style, Preferences, and Price columns.

Figure 10:
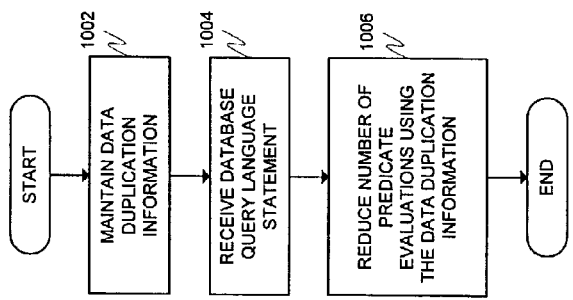
FIG. 10 is a flow chart of a method of improving performance of database query language statements according to one embodiment of the invention.

Illustrated in FIG. 10 is a method of improving performance of database query language statements. At 1002, information describing data duplication within a data block is maintained. As discussed above, there are several ways of maintaining data duplication information, e.g., using a symbol table. Data within the data block need not be compressed in order to maintain the data duplication information. A database query language statement with at least one predicate is received against data in the data block at 1004. Number of predicate evaluations are reduced using the data duplication information (1006). By reducing the number of predicate evaluations, performance of the database query language statement is improved.

Figure 11:
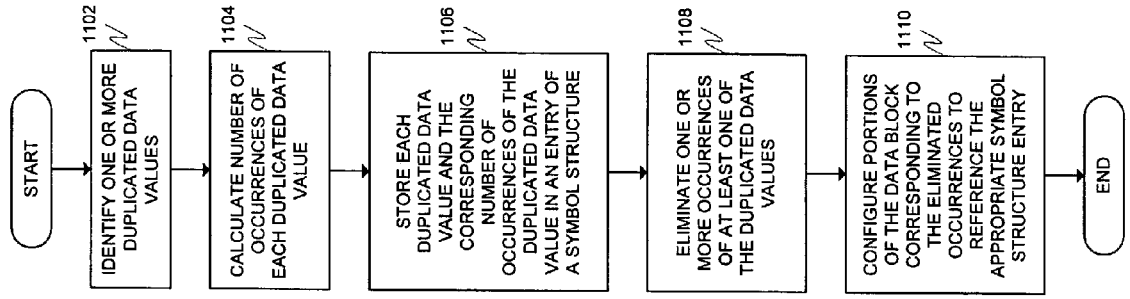
FIG. 11 depicts a process of maintaining data duplication information according to an embodiment of the invention.

One way of maintaining data duplication information is shown in FIG. 11. One or more duplicated data values are identified (1102) and the number of occurrences of each duplicated data value is calculated (1104). Each duplicated data value and its corresponding number of occurrences are stored in an entry of a symbol structure (1106). One or more occurrences of at least one of the duplicated data values are eliminated or removed from the data block (1108). Portions of the data block corresponding to the eliminated occurrences are configured to reference the appropriate symbol structure entry (1110). A link or a pointer may be used to reference the appropriate symbol structure entry.

An example of maintaining data duplication information is depicted in FIG. 12. A data block 1204 on disk 1202 contains four on-disk row structures 1206-1212. Each on-disk row structure corresponds to a row in a table (not shown). Two duplicated data values—"HR" and "LA"—are identified in data block 1204 and stored in symbol structure 1214 along with the number of occurrences of each duplicated data value. In the embodiment, symbol structure 1214 is stored in data block 1204 along with row structures 1206-1212. Data value "HR" occurs twice—once in portion 1216 of row structure 1206 and once in portion 1220 of row structure 1208. Data value "LA" occurs three times—once in portion 1218 of row structure 1206, once in portion 1222 in row structure 1210, and once in portion 1224 of row structure 1212. As shown in FIG. 12, the duplicated data values in data block 1204 are eliminated and portions 1216-1224 are configured to reference the appropriate entry in symbol structure 1214.

Figure 13:
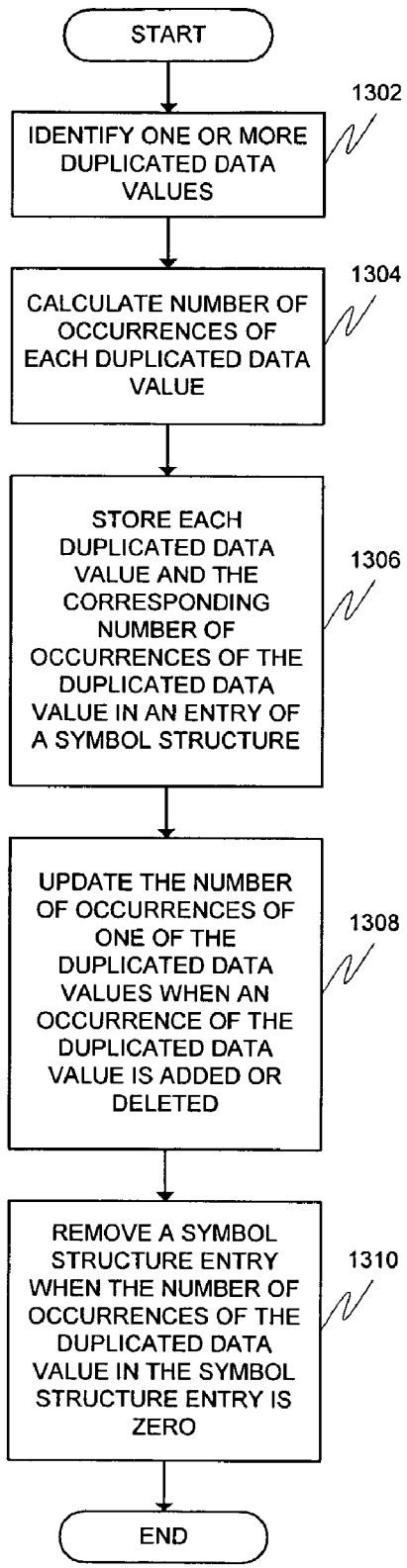
FIG. 13 shows a flow chart of a method of maintaining data duplication information according to another embodiment of the invention.

FIG. 13 illustrates another way of maintaining data duplication information. One or more duplicated data values are identified at 1302. The number of occurrences of each duplicated data value is calculated (1304). Each duplicated data value and its corresponding number of occurrences are stored in an entry of a symbol structure (1306). The number of occurrences of one of the duplicated data values is updated when an occurrence of the duplicated data value is added or deleted (1308). A symbol structure entry is removed when the number of occurrences of the duplicated data value in the symbol structure entry is zero (1310).

In FIG. 14, information on data duplication within data block 1404 on disk 1402 are maintained within symbol structure 1406. In the example, portion 1418 of on-disk row structure 1416 is updated from data value "LA" to data value "SF". Accordingly, entry 1420 in symbol structure 1406, which corresponds to duplicated data value "LA", is updated to reflect the deletion of a data value "LA" from data block 1404.

Figure 15:
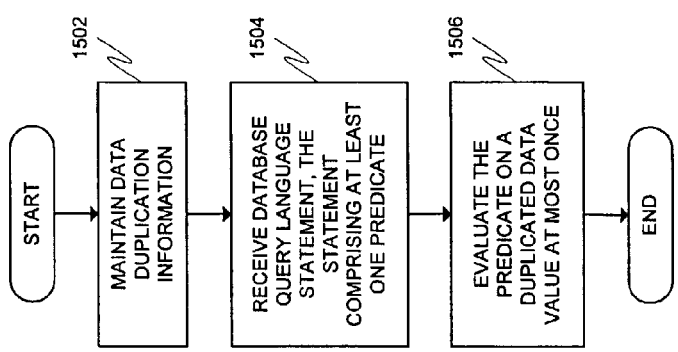
FIG. 15 is a process flow of a method of improving performance of database query language statements according to an embodiment of the invention.

Shown in FIG. 15 is an embodiment of a method of improving performance of database query language statements. At 1502, information on data duplication is maintained. A database query language statement is received (1504). The database query language statement includes at least one predicate. The predicate is evaluated on a duplicated data value at most once (1506).

Figure 16:
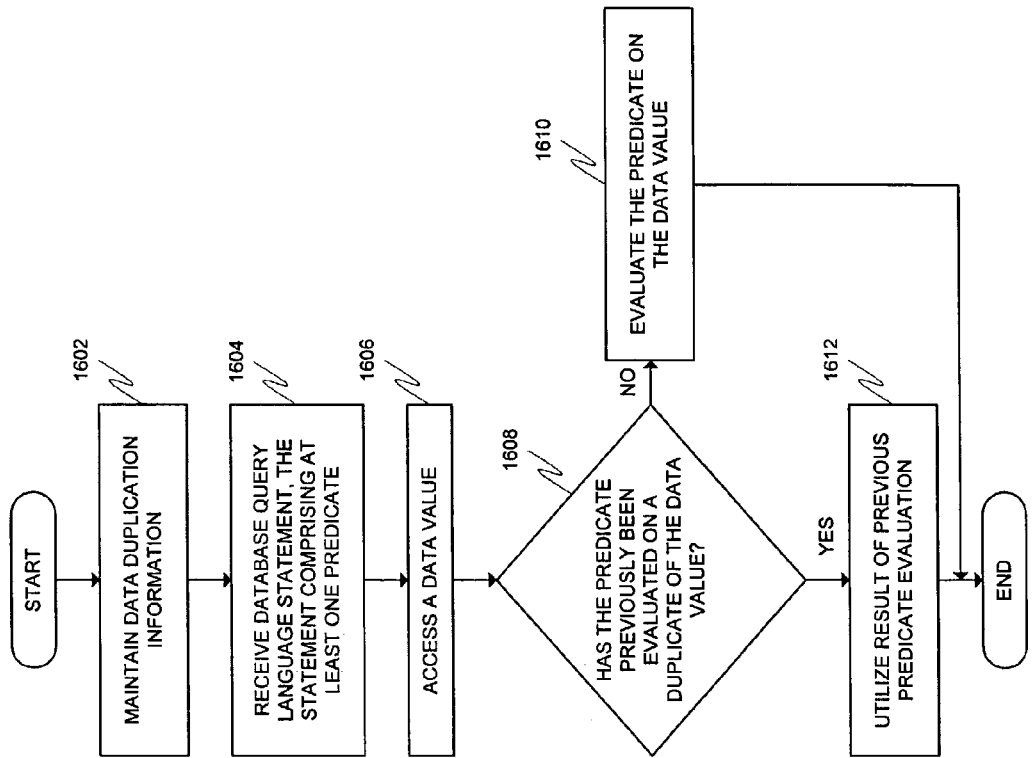
FIG. 16 depicts a flow chart of another method of improving performance of database query language statements.

FIG. 16 illustrates a process flow of another method of improving performance of database query language statements. In the embodiment, data duplication information is maintained (1602). A database query language statement with at least one predicate is received (1604) and a data value is accessed (1606). Before evaluating the at least one predicate on the data value, a determination is made as to whether the predicate has previously been evaluated on a duplicate of the data value (1608). If the predicate has not previously been evaluated on a duplicate of the data value, the predicate is evaluated on the data value (1610). If the predicate has previously been evaluated on a duplicate of the data value, result of the previous predicate evaluation is used instead of re-evaluating the predicate on the same data value (1612).

Figure 17:
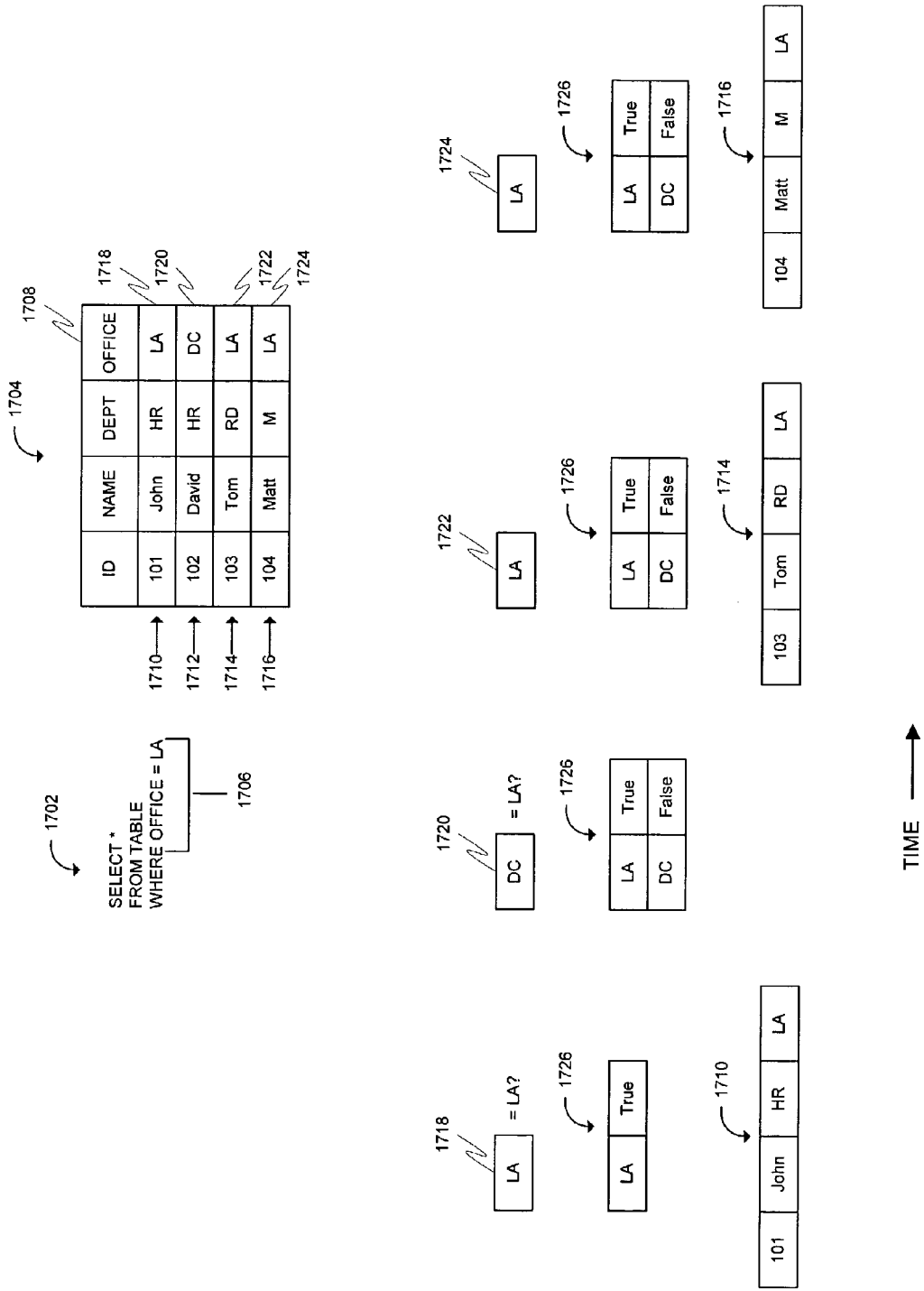
FIG. 17 illustrates an example of how performance of a database query language statement may be improved according to one embodiment of the invention.

An example of how performance of a database query language statement may be improved is shown in FIG. 17. A database query language statement 1702 is received against data in table 1704. Database query language statement 1702 seeks to find all records in table 1704 that satisfies predicate 1706, i.e., database query language statement 1702 seeks to find all records in table 1704 with data value "LA" in column 1708. Row 1710 is first accessed. Since there has not been any previous predicate evaluations, predicate 1706 is evaluated on data value 1718 in row 1710. The result of the predicate evaluation is stored in a context 1726. Row 1710 is returned as the predicate evaluation result is true.

Row 1712 is then accessed. Before evaluating predicate 1706 on data value 1720 in row 1712, a determination is made as to whether predicate 1706 has previously been evaluated on a duplicate of data value 1720. In one embodiment, context 1726 is checked to determine if there is a previous predicate evaluation result for the data value "DC"—a duplicate of data value 1720. Since the only data value that predicate 1706 has previously been evaluated on is "LA", predicate 1706 is evaluated on data value 1720. The result of the predicate evaluation is stored in context 1726. Row 1712 is not returned as the predicate evaluation result is false.

Next, row 1714 is accessed. Before evaluating predicate 1706 on data value 1722 in row 1714, a determination is made as to whether predicate 1706 has previously been evaluated on a duplicate of data value 1722. Since context 1726 includes a previous predicate evaluation result for the data value"LA", which is a duplicate of data value 1722, predicate 1706 is not evaluated on data value 1722. Instead, the previous predicate evaluation result in context 1726 is used. Row 1714 is returned as the previous predicate evaluation result was true. Row 1716 is accessed and processed in similar fashion. Thus, performance of the database query language statement is improved as predicate 1706 was only evaluated on two data values rather than on four data values.

Illustrated in FIG. 18 is a method of improving performance of database query language statements according to one embodiment of the invention. Information on data duplication within a data block is maintained (1802). A database query language statement with at least one predicate is received at 1804. Number of predicate evaluations (1806) and amount of data accessed by the database query language statement (1808) are reduced using the data duplication information.

FIG. 19 depicts one way of reducing amount of data accessed by a database query language statement. At 1902, total number of data values on which the predicate will evaluate to true is calculated. A counter is then set equal to the calculated total at 1904. A data value is accessed (1906) and the predicate is evaluated on the data value (1908). If the result of the predicate evaluation is false, then the process returns and accesses another data value at 1906. If the result of the predicate evaluation is true, then the counter is reduced by one (1910). At 1912, a determination is made as to whether the counter is now equal to zero. If the counter is not equal to zero, then the process returns to 1906 and accesses another data value. If the counter is equal to zero, the process ends.

Figure 20:
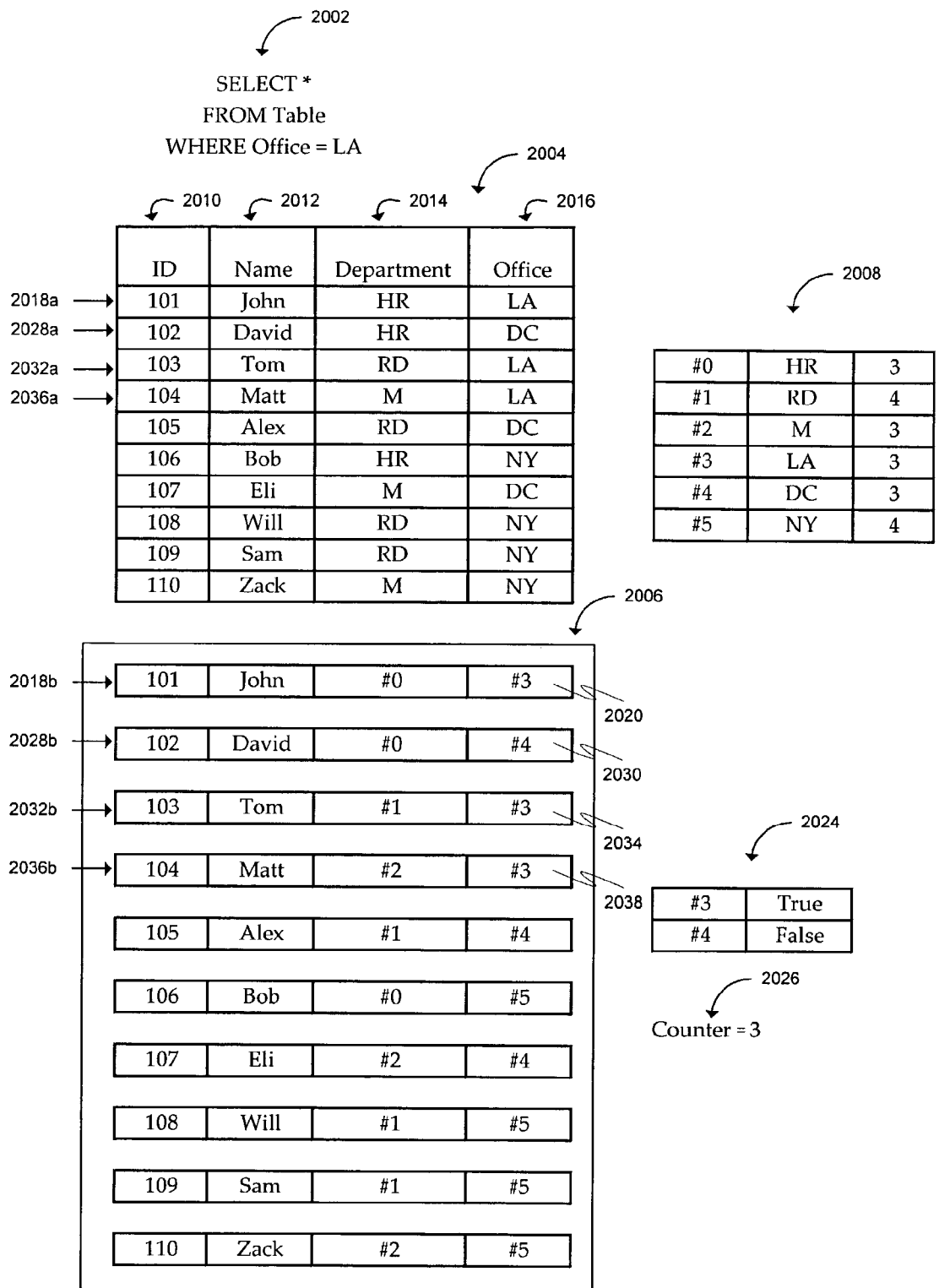
FIG. 20 is an example of how data duplication information may be used to improve performance of database query language statements according to one embodiment of the invention.

An example of how data duplication information may be used to improve performance of database query language statements is shown in FIG. 20. In FIG. 20, a database query language statement 2002 is received against data in table 2004, which is stored in data block 2006. Database query language statement 2002 seeks to find and return all rows of table 2004 that includes data value "LA" in Office column 2016. Table 2004 includes ten rows and 4 columns—ID column 2010, Name column 2012, Department column 2014, and Office column 2016. There are no duplicated data values in either ID column 2010 or Name column 2012. Department column 2014 and Office column 2016 each have three duplicated data values.

In the embodiment of FIG. 20, data duplication information is stored in a symbol table 2008. Symbol table 2008 includes a copy of each duplicated data value in table 2004 along with the corresponding number of occurrences of the duplicated data value. Each entry in symbol table 2008 also includes an entry number that can be used in data block 2006 to reference the symbol table entry. As illustrated in FIG. 20, each occurrence of a duplicated data value in data block 2006 is replaced with the corresponding symbol table entry number rather than a pointer or a link to the corresponding symbol table entry.

To evaluate database query language statement 2002, row structure 2018*b* in data block 2006, which corresponds to row 2018*a* in table 2004, is accessed. Since portion 2020 of row structure 2018*b*, which corresponds to column 2016 of row 2018*a*, references entry number #3 in symbol table 2008, duplicated data value "LA" is retrieved from symbol table 2008 and evaluated against the predicate in database query language statement 2002. The result of the predicate evaluation is stored in a context 2024. A counter 2026 is then set to "3", which is equal to the number of occurrences of duplicated data value "LA" in table 2004, since "LA" is the only data value in which the predicate will evaluate to true. Row 2018*a* of table 2004 is then returned and counter 2026 reduced by 1. When counter 2026 becomes zero, sequential row access of data block 2006 can end since the maximum number of rows that will satisfy the database query language statement will have been returned.

Next, row structure 2028*b* in data block 2006, which corresponds to row 2028*a* in table 2004, is accessed. Portion 2030 of row structure 2028*b*, which corresponds to column 2016 of row 2028*a*, references entry number #4 in symbol table 2008. Before duplicated data value "DC" is retrieved from symbol table 2008 and evaluated against the predicate in database query language statement 2002, context 2024 is checked to determine whether there is a previous predicate evaluation result for entry number #4. Since context 2024 does not contain a result of a previous predicate evaluation for entry number #4, duplicated data value "DC" is retrieved from symbol table 2008 and evaluated against the predicate in database query language statement 2002. The result of the predicate evaluation is then stored in context 2024. Row 2028*a* is not returned and counter 2026 is not reduced because the result of the predicate evaluation is false.

Row structure 2032*b* in data block 2006, which corresponds to row 2032*a* in table 2004, is accessed. Portion 2034 of row structure 2032*b*, which corresponds to column 2016 of row 2032*a*, references entry number #3 in symbol table 2008. Since context 2024 already contains a result of a previous predicate evaluation for entry number #3, the predicate need not be evaluated again. Given that the result of the previous predicate evaluation for entry number #3 is true, row 2032*a* is returned and counter 2026 is reduced by 1.

Row structure 2036*b* in data block 2006, which corresponds to row 2036*a* in table 2004, is accessed in much the same way as row structure 2032*b*. Like portion 2034 of row structure 2032*b*, portion 2038 of row structure 2036*b*, which corresponds to column 2016 of row 2036*a*, references entry number #3 in symbol table 2008. Since context 2024 already contains a result of a previous predicate evaluation for entry number #3, the predicate need not be evaluated again. Given that the result of the previous predicate evaluation for entry number #3 is true, row 2036*a* is returned and counter 2026 is again reduced by 1. Sequential row access of data block 2006 then ends as all rows that will satisfy database query language statement 2002 has been returned.

In the example shown in FIG. 20, not only was the number of predicate evaluations reduced from four to two, but the number of rows accessed was also reduced from ten to four as a result of having the data duplication information. Thus, performance of database query language statements may be greatly improved by maintaining information on data duplication within a data block.

Since only one unique data value could satisfy the predicate of database query language statement 2002 in FIG. 20, the total number of data values in the data block on which the predicate will evaluate to true is calculated by simply looking at symbol table 2008. For a database query language statement where more than one unique data value could satisfy the predicate, the total number of data values in the data block on which the predicate will evaluate to true is calculated by totaling the number of occurrences of each unique data value in the data block that will satisfy the predicate. For example, if three different unique data values—X, Y, and Z—could satisfy the predicate and X occurs five times in the data block, Y occurs eight times in the data block, and Z occurs three times in the data block, the total number of data values in the data block on which the predicate will evaluate to true is equal to five plus eight plus three, which is sixteen. Hence, counter 2026 in FIG. 20 would be set to sixteen and reduced each time a satisfying data value is returned. Therefore, the amount of data accessed to satisfy a database query language statement may be significantly reduced.

FIG. 21 illustrates a process flow of another method of improving performance of database query language statements. Data duplication information within a data block is maintained (2102). A database query language statement with at least one predicate is received at 2104. The number of predicate evaluations is reduced using the data duplication information (2106). In addition, rather than accessing data values to satisfy the database query language statement, the data duplication information is updated instead (2108).

Figure 22:
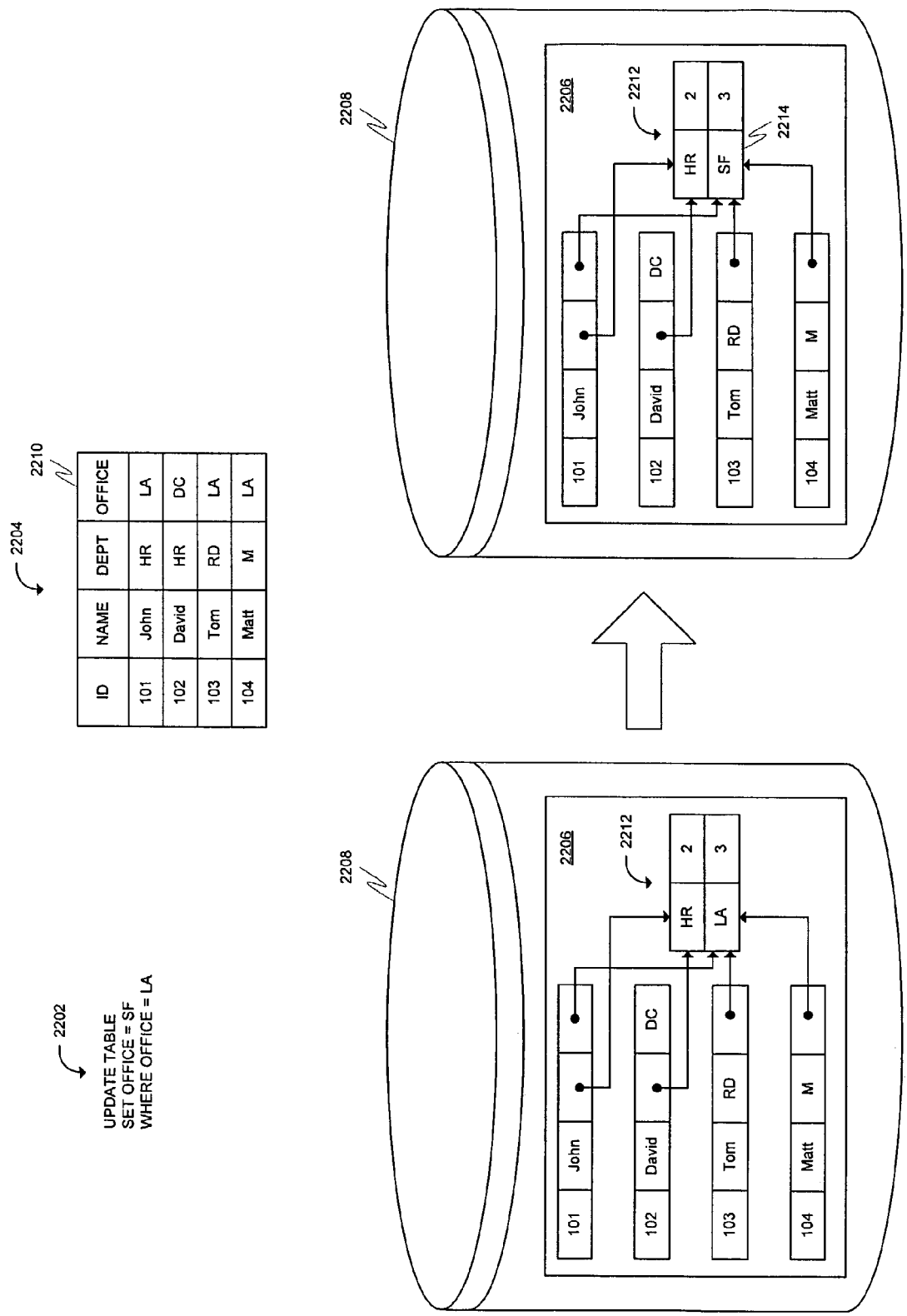
FIG. 22 shows an example of how data duplication information may be used to satisfy a database query language statement according to one embodiment of the invention.

Shown in FIG. 22 is an example of how data duplication information may be updated to satisfy a database query language statement instead of accessing data values in a data block. A database query language statement 2202 is received against table 2204, which is stored in data block 2206 of disk 2208. Database query language statement 2202 seeks to change data values "LA" in Office column 2210 of table 2204 from "LA" to "SF". Since information on data duplication is already being maintained in symbol structure 2212, as described above with respect to FIG. 12, only entry 2214 in symbol structure 2212 need to be updated from "LA" to "SF" to satisfy database query language statement 2202. Thus, performance of database query language statements may be greatly improved when data duplication information is available.

System Architecture Overview

Figure 23:
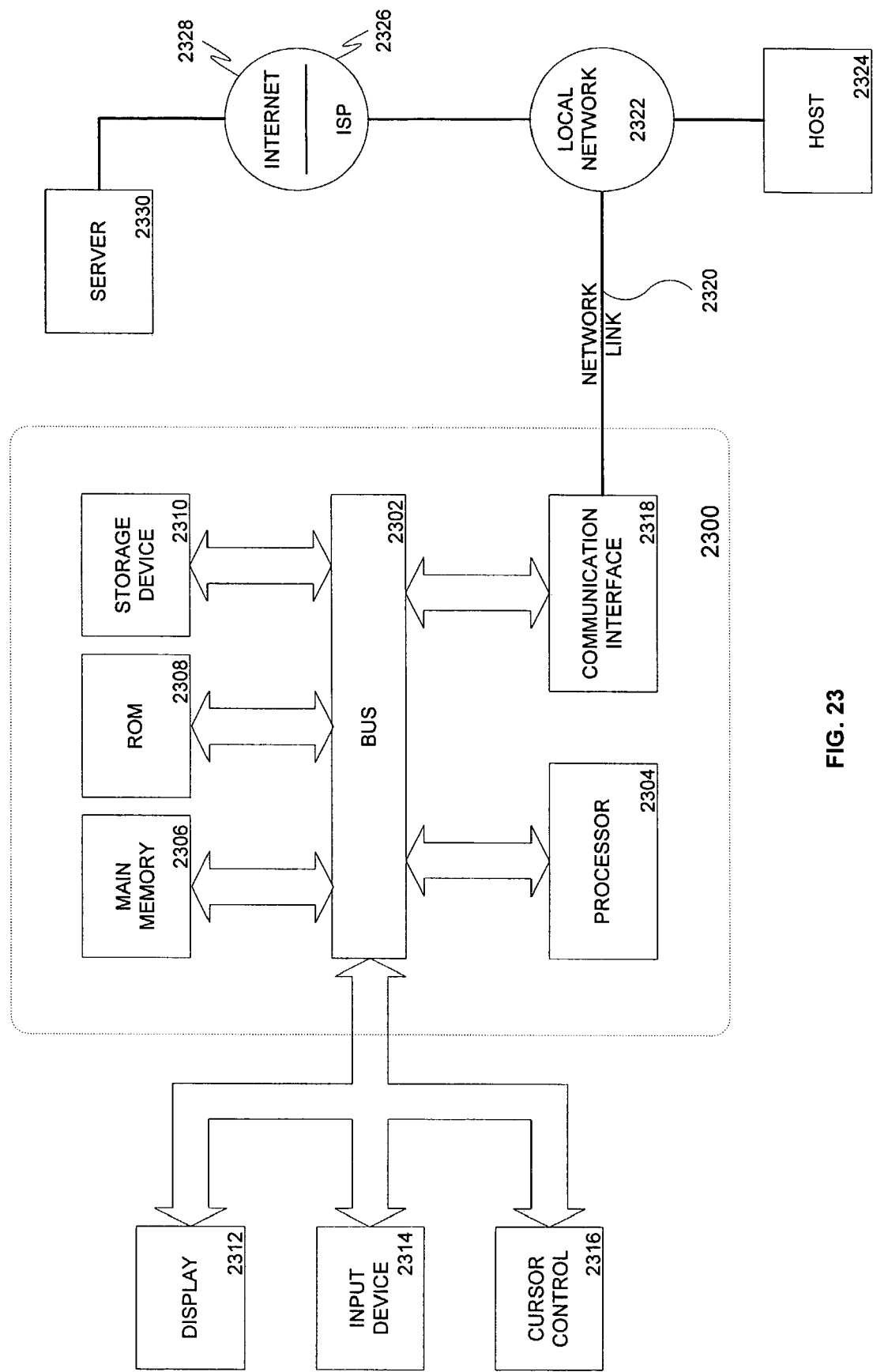
FIG. 23 is a diagram of a computer system with which embodiments of the present invention can be implemented.

FIG. 23 is a block diagram that illustrates a computer system 2300 upon which a method of improving performance of database query language statements may be implemented. Computer system 2300 includes a bus 2302 or other communication mechanisms for communicating information, and a processor 2304 couple with bus 2302 for processing information. Computer system 2300 also includes a main memory 2306, such as a random access memory (RAM) or other dynamic storage device, couple to bus 2302 for storing information and instructions to be executed by processor 2304. Main memory 2306 also may be used for storing temporary variables or other intermediate information during execution of instructions to be executed by processor 2304. Computer system 2300 further includes read only memory (ROM) 2308 or other static storage device couple to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

In one embodiment computer system 2300 is used to improve performance of database query language statements. According to one embodiment, such use is provided by computer system 2300 in response to processor 2304 executing one or more sequences of one or more instructions contained in main memory 2306. Such instructions may be read into main memory 2306 from another computer-readable medium, such as storage device 2310. Execution of the sequences of instructions contained in main memory 2306 causes processor 2304 to perform the process steps described herein. One or more processors in a multi-processing arrangement may also be employed to execute the sequences of instructions contained in main memory 2306. In other embodiments, hard-wired circuitry may be used in place of or in combination with software instructions. Thus, embodiments of the invention are not limited to any specific combination of hardware circuitry and software.

The term "computer-readable medium" as used herein refers to any medium that participates in providing instructions to processor 2304 for execution. Such a medium may take many forms, including but not limited to, non-volatile media, volatile media, and transmission media. Non-volatile media includes, for example, optical or magnetic disks, such as storage device 2310. Volatile media includes dynamic memory, such as main memory 2306. Transmission media includes coaxial cables, copper wire and fiber optics, including the wires that comprise bus 2302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2304 for execution. For example, the instructions may initially be carried on a magnetic disk of a remote computer. The remote computer can load the instructions into its dynamic memory and send the instructions over a telephone line using a modem. A modem local to computer system 2300 can receive the data on the telephone line and use an infrared transmitter to convert the data to an infrared signal.

An infrared detector coupled to bus 2302 can receive the data carried in the infrared signal and place the data on bus 2302. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card or a modem to provide a data communication connection to a corresponding type of telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams. The signals through the various networks and the signals on network link 2320 and through communication interface 2318, which carry the digital data to and from computer system 2300, are exemplary forms of carrier waves transporting the information.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318. In accordance with the invention, one such downloaded application provides for managing, storing, and retrieving data from a storage system containing multiple data storage devices. The received code may be executed by processor 2304 as it is received, and/or stored in storage device 2310, or other non-volatile storage for later execution. In this manner, computer system 2300 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method of improving performance of database query language statements for a database which comprises a data block, wherein the data block comprises a duplicated data value and a non-duplicated data value, the method comprising:
   identifying the duplicated data value in the data block and storing the duplicated data value in a first entry of a symbol structure for data duplication information;
   identifying the non-duplicated data value in the data block and not storing the non-duplicated data value in the symbol structure;
   calculating a number of occurrences of the duplicated data value in the data block;
   storing the number of occurrences of the duplicated data value in a second entry of the symbol structure for the data duplication information, wherein the identification of the duplicated data value and the calculation of the number of occurrences of the duplicated data value is determined before storing the duplicated data value in the symbol structure;
   receiving a database query language statement against data in the data block, the database query language statement comprising at least one predicate; and
   performing a number of predicate evaluations on data in the data block accessed by the database query language statement using the data duplication information stored in the symbol structure.

2. The method of claim 1 further comprising:
   eliminating one or more occurrences of the duplicated data value from the data block; and
   configuring portions of the data block corresponding to the eliminated occurrences to reference the appropriate symbol structure entry.

3. The method of claim 2 wherein a link or a pointer is used to reference the appropriate symbol structure entry.

4. The method of claim 1 further comprising:
   updating the number of occurrences of the duplicated data value when an occurrence of the duplicated data value is added or deleted; and
   removing a symbol structure entry when the number of occurrences of the duplicated data value in the symbol structure entry is zero.

5. The method of claim 1 wherein performing a number of predicate evaluations on data in the data block accessed by the database query language statement comprises evaluating the at least one predicate on the duplicated data value or a second duplicated data value whose number of occurrences is greater than one in the data block at most once.

6. The method of claim 1 wherein performing a number of predicate evaluations on data in the data block accessed by the database query language statement comprises:
   determining whether the at least one predicate has previously been evaluated on a duplicate of a data value in the data block before evaluating the at least one predicate on the data value;
   utilizing a result of a previous evaluation of the at least one predicate on a duplicate of the data value when the at least one predicate has previously been evaluated on the duplicate of the data value; and
   evaluating the at least one predicate on the data value when the at least one predicate has not previously been evaluated on a duplicate of the data value.

7. The method of claim 6 wherein determining whether the at least one predicate has previously been evaluated on a duplicate of a data value comprises verifying whether the data value appears in a context, the context storing each data value in the data block that the at least one predicate has previously been evaluated on and a corresponding result of the previous predicate evaluation.

8. The method of claim 1 wherein performing a number of predicate evaluations on data in the data block accessed by the database query language statement comprises:
   calculating total number of data values in the data block on which the at least one predicate will evaluate to true;
   setting a counter equal to the total;
   reducing the counter when a third data value, the duplicated data value, or the non-duplicated data value in the data block on which the at least one predicate evaluated to true is accessed; and
   accessing data values in the data block until the counter is equal to zero.

9. The method of claim 1 wherein performing a number of predicate evaluations on data in the data block accessed by the database query language statement comprises updating the data duplication information instead of accessing data values in the data block.

10. The method of claim 1 wherein the symbol structure is stored in the data block.

11. A computer implemented method of improving performance of database query language statements for a database which comprises a data block, wherein the data block comprises a duplicated data value and a non-duplicated data value, the method comprising:
    identifying the duplicated data value in the data block and storing the duplicated data value in a first entry of a symbol structure for data duplication information;
    identifying the non-duplicated data value in the data block and not storing the non-duplicated data value in the symbol structure;
    maintaining information describing the data duplication information within a data block;
    receiving a database query language statement against data in the data block, the database query language statement comprising at least one predicate;
    storing a number of occurrences of the duplicated data value in a second entry of the symbol structure, wherein the number of occurrences of the duplicated data value is determined before storing the duplicated data value in the symbol structure; and performing a number of predicate evaluations on the data in the data block using the data duplication information in the symbol structure.

12. The method of claim 11 wherein maintaining information describing data duplication within a data block comprises:
identifying one or more duplicated data values in the data block; and
calculating the number of occurrences of the duplicated data values.

13. The method of claim 12 wherein maintaining information describing data duplication within a data block further comprises:
eliminating one or more occurrences of the duplicated data value from the data block; and
configuring portions of the data block corresponding to the eliminated occurrences to reference the appropriate symbol structure entry.

14. The method of claim 13 wherein a link or a pointer is used to reference the appropriate symbol structure entry.

15. The method of claim 12 wherein maintaining information describing data duplication within a data block further comprises updating the number of occurrences of the duplicated data value when an occurrence of the duplicated data value is added or deleted.

16. The method of claim 15 wherein maintaining information describing data duplication within a data block further comprises removing a symbol structure entry when the number of occurrences of the duplicated data value in the symbol structure entry is zero.

17. The method of claim 11 wherein performing a number of predicate evaluations on data in the data block comprises evaluating the at least one predicate on the duplicated data value or a second duplicated data value whose number of occurrences are greater than one in the data block at most once.

18. The method of claim 11 wherein performing a number of predicate evaluations on data in the data block comprises:
determining whether the at least one predicate has previously been evaluated on a duplicate of a data value in the data block before evaluating the at least one predicate on the data value;
utilizing a result of a previous evaluation of the at least one predicate on the duplicate of the data value when the at least one predicate has previously been evaluated on the duplicate of the data value; and
evaluating the at least one predicate on the data value when the at least one predicate has not previously been evaluated on the duplicate of the data value.

19. The method of claim 18 wherein determining whether the at least one predicate has previously been evaluated on the duplicate of the data value comprises verifying whether the data value appears in a context, the context storing each data value in the data block that the at least one predicate has previously been evaluated on and a corresponding result of the previous predicate evaluation.

20. The method of claim 11 further comprising reducing an amount of data accessed by the database query language statement using the data duplication information in the symbol structure.

21. The method of claim 20 wherein the act of reducing the amount of data accessed by the database query language statement comprises:
calculating total number of data values in the data block on which the at least one predicate will evaluate to true;
setting a counter equal to the total;
reducing the counter when a third data value, the duplicated data value, or the non-duplicated data value in the data block on which the at least one predicate evaluated to true is accessed; and
accessing data values in the data block until the counter is equal to zero.

22. The method of claim 20 wherein the act of reducing the amount of data accessed by the query comprises updating the data duplication information instead of accessing data values in the data block.

23. The method of claim 11 wherein the data duplication information is maintained in the data block.

24. A computer program product that includes a computer readable storage medium, the computer readable medium having stored thereon a sequence of instructions which, when executed by a processor, causes the processor to execute a process for improving performance of database query language statements for a database which comprises a data block wherein the data block comprises a duplicated data value and a non-duplicated data value, the process comprising:
identifying the duplicated data value in the data block and storing the duplicated data value in a first entry of a symbol structure for data duplication information;
identifying the non-duplicated data value in the data block and not storing the non-duplicated data value in the symbol structure;
maintaining information describing data duplication information within a data block;
receiving a database query language statement against data in the data block, the database query language statement comprising at least one predicate;
storing a number of occurrences of the duplicated data value in a second entry of the symbol structure, wherein the number of occurrences of the duplicated data value is determined before storing the duplicated data value in the symbol structure; and
performing a number of predicate evaluations on data in the data block using the data duplication information in the symbol structure.

25. The computer program product of claim 24 wherein maintaining information describing data duplication within a data block comprises:
identifying one or more duplicated data values in the data block; and
calculating a number of occurrences of the duplicated data value.

26. The computer program product of claim 25 wherein maintaining information describing data duplication within a data block further comprises:
eliminating one or more occurrences of the duplicated data value from the data block; and
configuring portions of the data block corresponding to the eliminated occurrences to reference the appropriate symbol structure entry.

27. The computer program product of claim 25 wherein maintaining information describing data duplication within a data block further comprises:
updating the number of occurrences of the duplicated data value when an occurrence of the duplicated data value is added or deleted; and
removing a symbol structure entry when the number of occurrences of the duplicated data value in the symbol structure entry is zero.

28. The computer program product of claim 24 wherein performing a number of predicate evaluations on data in the data block comprises evaluating the at least one predicate on the duplicated data value in the data block at most once.

29. The computer program product of claim 24 wherein performing a number of predicate evaluations on data in the data block comprises:
- determining whether the at least one predicate has previously been evaluated on a duplicate of the data value in the data block before evaluating the at least one predicate on the data value;
- utilizing a result of a previous evaluation of the at least one predicate on the duplicate of the data value when the at least one predicate has previously been evaluated on the duplicate of the data value; and
- evaluating the at least one predicate on the data value when the at least one predicate has not previously been evaluated on the duplicate of the data value.

30. The computer program product of claim 24 further comprising reducing an amount of data accessed by the database query language statement using the data duplication information in the symbol structure.

31. The computer program product of claim 30 wherein the act of reducing the amount of data accessed by the database query language statement comprises:
- calculating total number of data values in the data block on which the at least one predicate will evaluate to true;
- setting a counter equal to the total;
- reducing the counter when a third data value, the duplicated data value, or the non-duplicated data value in the data block on which the at least one predicate evaluated to true is accessed; and
- accessing data values in the data block until the counter is equal to zero.

32. The computer program product of claim 30 wherein the act of reducing the amount of data accessed by the database query language statement comprises updating the data duplication information instead of accessing data values in the data block.

33. The computer program product of claim 24 wherein the data duplication information is maintained in the data block.

34. A system for improving performance of database query language statements for a database which comprises a data block, wherein the data block comprises a duplicated data value and a non-duplicated data value, the system comprising:
- means for identifying the duplicated data value in the data block and storing the duplicated data value in a first entry of a symbol structure as data duplication information;
- means for identifying the non-duplicated data value in the data block and not storing the non-duplicated data value in the symbol structure;
- means for maintaining information describing data duplication within a data block;
- means for receiving a database query language statement against data in the data block, the database query language statement comprising at least one predicate;
- means for storing a number of occurrences of the duplicated data value in a second entry of the symbol structure, wherein the number of occurrences of the duplicated data value is determined before the means for storing stores the duplicated data value in the symbol structure; and
- means for performing a number of predicate evaluations on data in the data block using the data duplication information in the symbol structure.

35. The system of claim 34 wherein means for maintaining information describing data duplication within a data block comprises:
- means for identifying one or more duplicated data values in the data block; and
- means for calculating the number of occurrences of the duplicated data value.

36. The system of claim 35 wherein means for maintaining information describing data duplication within a data block further comprises:
- means for eliminating one or more occurrences of the duplicated data value from the data block; and
- means for configuring portions of the data block corresponding to the eliminated occurrences to reference the appropriate symbol structure entry.

37. The system of claim 35 wherein means for maintaining information describing data duplication within a data block further comprises:
- means for updating the number of occurrences of the duplicated data value when an occurrence of the duplicated data value is added or deleted; and
- means for removing a symbol structure entry when the number of occurrences of the duplicated data value in the symbol structure entry is zero.

38. The system of claim 34 wherein the means for performing a number of predicate evaluations on data in the data block comprises means for evaluating the at least one predicate on a duplicated data value in the data block at most once.

39. The system of claim 34 wherein the means for performing a number of predicate evaluations on data in the data block comprises:
- means for determining whether the at least one predicate has previously been evaluated on a duplicate of a data value in the data block before evaluating the at least one predicate on the data value;
- means for utilizing a result of a previous evaluation of the at least one predicate on a duplicate of the data value when the at least one predicate has previously been evaluated on the duplicate of the data value; and
- means for evaluating the at least one predicate on the data value when the at least one predicate has not previously been evaluated on a duplicate of the data value.

40. The system of claim 34 further comprising means for reducing an amount of data accessed by the database query language statement using the data duplication information in the symbol structure.

41. The system of claim 40 wherein the means for reducing an amount of data accessed by the database query language statement comprises:
- means for calculating total number of data values in the data block on which the at least one predicate will evaluate to true;
- means for setting a counter equal to the total;
- means for reducing the counter when a third data value, the duplicated data value, or the non-duplicated data value in the data block on which the at least one predicate evaluated to true is accessed; and
- means for accessing data values in the data block until the counter is equal to zero.

42. The system of claim 40 wherein the means for reducing the amount of data accessed by the database query language statement comprises means for updating the data duplication information instead of accessing data values in the data block.

43. The system of claim 34 wherein the data duplication information is maintained in the data block.

44. A computer program product that includes a computer-readable storage medium having a sequence of instructions which, when executed by a processor, causes the processor to execute a process for a database which comprises a data block, wherein the data block comprises a duplicated data value and a non-duplicated data value, said process comprising:

identifying the duplicated data value in the data block and storing the duplicated data value in a first entry of a symbol structure as data duplication information;

identifying the non-duplicated data value in the data block and not storing the non-duplicated data value in the symbol structure;

calculating the number of occurrences of the duplicated data value;

storing the first number of occurrences of the duplicated data value in a second entry of the symbol structure, wherein the means for identifying identifies the duplicated data value and the means for calculating calculates the number of occurrences of the duplicated data value before the means for storing stores each of the duplicated data value in the symbol structure;

receiving a database query language statement against data in the data block, the database query language statement comprising at least one predicate;

performing a number of predicate evaluations on data in the data block accessed by the database query language statement using the data duplication information in the symbol structure.

45. The computer program product of claim 44, the process further comprising:

eliminating one or more occurrences of the duplicated data value from the data block; and configuring portions of the data block corresponding to the eliminated occurrences to reference an appropriate symbol structure entry.

46. The computer program product of claim 45, in which a link or a pointer is used to reference the appropriate symbol structure entry.

47. The computer program product of claim 44, the process further comprising:

updating the number of occurrences of the duplicated data value when an occurrence of the duplicated data value is added or deleted; and removing a symbol structure entry when the number of occurrences of the duplicated data value in the symbol structure entry is not greater than one.

48. The computer program product of claim 44, in which said act of performing the number of predicate evaluations on data in the data block comprises evaluating the at least one predicate on the duplicated data value in the data block at most once.

49. The computer program product of claim 44, in which said act of performing the number of predicate evaluations on data in the data block comprises:

determining whether the at least one predicate has previously been evaluated on a duplicate of a data value in the data block before evaluating the at least one predicate on the data value;

utilizing a result of a previous evaluation of the at least one predicate on the duplicate of the data value when the at least one predicate has previously been evaluated on the duplicate of the data value; and evaluating the at least one predicate on the data value when the at least one predicate has not previously been evaluated on the duplicate of the data value.

50. The computer program product of claim 49, in which said act of determining whether the at least one predicate has previously been evaluated on the duplicate of the data value comprises verifying whether the data value appears in a context, the context storing each data value in the data block that the at least one predicate has previously been evaluated on and a corresponding result of the previous predicate evaluation.

51. The computer program product of claim 44, in which said act of performing the number of predicate evaluations on data in the data block accessed by the database query language statement comprises:

calculating a total number of data values in the data block on which the at least one predicate will evaluate to true;

setting a counter equal to the total number;

reducing the counter when a third data value, the duplicated data value, or the non-duplicated data value in the data block on which the at least one predicate evaluated to true is accessed; and accessing the data values in the data block until the counter is equal to zero.

52. The computer program product of claim 44, in which said act of performing reducing the number of predicate evaluations on data in the data block accessed by the database query language statement comprises means for updating the data duplication information instead of accessing data values in the data block.

53. The computer program product of claim 44, in which said symbol structure is stored in the data block.

54. A system for improving performance of database query language statements for a database which comprises a data block, wherein the data block comprises a duplicated data value and a non-duplicated data value, the method comprising:

means for identifying the duplicated data value in the data block and storing the duplicated data value in a first entry of a symbol structure for data duplication information;

means for identifying the non-duplicated data value in the data block and not storing the non-duplicated data value in the symbol structure;

means for calculating a number of occurrences of the duplicated data value;

means for storing the number of occurrences of the duplicated data value in a second entry of the symbol structure, wherein the means for identifying identifies the duplicated data value and the means for calculating calculates the number of occurrences of the duplicated data value before storing the duplicated data value in the symbol structure;

means for receiving a database query language statement against data in the data block, the database query language statement comprising at least one predicate; and means for performing a number of predicate evaluations on data in the data block accessed by the database query language statement using the data duplication information in the symbol structure.

55. The system of claim 54, further comprising:

means for eliminating one or more occurrences of the duplicated data value from the data block; and means for configuring portions of the data block corresponding to the eliminated occurrences to reference the appropriate symbol structure entry.

56. The system of claim 54, in which a link or a pointer is used to reference the appropriate symbol structure entry.

57. The system of claim 54, further comprising:

means for updating the number of occurrences of the duplicated data value when an occurrence of the duplicated data value is added or deleted; and means for removing a symbol structure entry when the number of occurrences of the duplicated data value in the symbol structure entry is not greater than one.

58. The system of claim 54, in which said means for performing the number of predicate evaluations on data in the data block comprises means for evaluating the at least one predicate on the duplicated data value or a second duplicated data value whose number of occurrences is greater than one in the data block at most once.

59. The system of claim 54, in which said means for performing the number of the predicate evaluations on data in the data block accessed by the database query language statement comprises:

means for determining whether the at least one predicate has previously been evaluated on the duplicate of the data value in the data block before evaluating the at least one predicate on the data value;

means for utilizing a result of a previous evaluation of the at least one predicate on the duplicate of the data value when the at least one predicate has previously been evaluated on the duplicate of the data value; and means for evaluating the at least one predicate on the data value when the at least one predicate has not previously been evaluated on the duplicate of the data value.

60. The system of claim 59, in which said means for determining whether the at least one predicate has previously been evaluated on the duplicate of the data value comprises means for verifying whether the data value appears in a context, the context storing each data value in the data block that the at least one predicate has previously been evaluated on and a corresponding result of the previous predicate evaluation.

61. The system of claim 54, in which said means for performing the number of predicate evaluations on data in the data block and amount of data in the data block accessed by the database query language statement comprises:

means for calculating a total number of data values in the data block on which the at least one predicate will evaluate to true;

means for setting a counter equal to the total number;

means for reducing the counter when a third data value, the duplicated data value, or the non-duplicated data value in the data block on which the at least one predicate evaluated to true is accessed; and means for accessing the data values in the data block until the counter is equal to zero.

62. The system of claim 54, in which said means for performing the number of predicate evaluations on data in the data block accessed by the database query language statement comprises means for updating the data duplication information instead of accessing data values in the data block.

63. The system of claim 54, in which said symbol structure is stored in the data block.

* * * * *

UNITED STATES PATENT AND TRADEMARK OFFICE
CERTIFICATE OF CORRECTION

| | | |
|---|---|---|
| PATENT NO. | : 7,454,403 B2 | Page 1 of 1 |
| APPLICATION NO. | : 10/426452 | |
| DATED | : November 18, 2008 | |
| INVENTOR(S) | : Potapov et al. | |

It is certified that error appears in the above-identified patent and that said Letters Patent is hereby corrected as shown below:

In column 1, line 22, delete "modem" and insert -- modern --, therefor.

In column 1, line 31, delete "modem" and insert -- modern --, therefor.

In column 9, line 44, delete "706a,does" and insert -- 706a, does --, therefor.

In column 12, line 53, delete "value"LA"," and insert -- value "LA", --, therefor.

In column 20, line 18, in Claim 24, after "block" insert -- , --.

Signed and Sealed this

Twenty-seventh Day of April, 2010

David J. Kappos
*Director of the United States Patent and Trademark Office*